US012272045B2

(12) United States Patent
Tsurusu et al.

(10) Patent No.: US 12,272,045 B2
(45) Date of Patent: *Apr. 8, 2025

(54) DIMENSIONAL INFORMATION MANAGEMENT DEVICE, DIMENSIONAL INFORMATION MANAGEMENT SYSTEM COMPRISING THE SAME, DIMENSIONAL INFORMATION MANAGEMENT METHOD, AND DIMENSIONAL INFORMATION MANAGEMENT PROGRAM

(71) Applicant: OMRON CORPORATION, Kyoto (JP)

(72) Inventors: Tetsuro Tsurusu, Takatsuki (JP); Shingo Kawamoto, Ichinomiya (JP); Mitsunori Sugiura, Nagoya (JP)

(73) Assignee: OMRON CORPORATION, Kyoto (JP)

( * ) Notice: Subject to any disclaimer, the term of this patent is extended or adjusted under 35 U.S.C. 154(b) by 258 days.

This patent is subject to a terminal disclaimer.

(21) Appl. No.: 17/495,903

(22) Filed: Oct. 7, 2021

(65) Prior Publication Data

US 2022/0130034 A1 Apr. 28, 2022

(30) Foreign Application Priority Data

Oct. 28, 2020 (JP) ................................ 2020-180402

(51) Int. Cl.
*G06T 7/00* (2017.01)
*G06T 7/60* (2017.01)
*G06T 7/70* (2017.01)

(52) U.S. Cl.
CPC ............ *G06T 7/0008* (2013.01); *G06T 7/001* (2013.01); *G06T 7/60* (2013.01); *G06T 7/70* (2017.01); *G06T 2207/10028* (2013.01)

(58) Field of Classification Search
CPC ......... G06T 7/0008; G06T 7/70; G06T 7/001; G06T 7/60; G06T 2207/10028
See application file for complete search history.

(56) References Cited

U.S. PATENT DOCUMENTS 5,296,807 A    3/1994  Kousek et al.
6,609,451 B1   8/2003  Inoue et al.
(Continued)

FOREIGN PATENT DOCUMENTS

JP    H5-45472 A      2/1993
JP    H05-281366 A   10/1993
(Continued)

OTHER PUBLICATIONS

Office Action issued on Sep. 5, 2023 in a related Japanese patent application.
(Continued)

*Primary Examiner* — Wednel Cadeau
(74) *Attorney, Agent, or Firm* — METROLEX IP LAW GROUP, PLLC; Robert L. Scott, Esq.

(57) ABSTRACT

It is an object of the present invention to provide a dimensional information management device with which search information about a buried object in a target can be effectively utilized, and the burden on the worker can be reduced, as well as a dimensional information management system comprising this dimensional information management device. A dimensional information management device 40 manages dimensional information about a buried object 51 included in a search image showing the presence or absence of the buried object in a wall surface 50 generated by a buried object scanning device 10 that has been scanned along the wall surface 50, said dimensional information management device comprising a data receiving unit 41 and a memory unit 43. The data receiving unit 41 acquires search information including a search image from the buried object (Continued)

scanning device 10. The memory unit 43 stores the search information acquired by the data receiving unit 41.

13 Claims, 33 Drawing Sheets

(56) References Cited

U.S. PATENT DOCUMENTS

| | | |
|---|---|---|
| 6,679,153 B2 | 1/2004 | Inoue et al. |
| 8,902,251 B2 | 12/2014 | Nielson et al. |
| 8,907,978 B2 | 12/2014 | Nielson et al. |
| 8,907,980 B2 | 12/2014 | Nielson et al. |
| 8,917,288 B2 | 12/2014 | Nielson et al. |
| 8,928,693 B2 | 1/2015 | Nielson et al. |
| 8,929,693 B2 | 1/2015 | Shin et al. |
| 8,994,749 B2 | 3/2015 | Nielson et al. |
| 9,165,331 B2 | 10/2015 | Nielson et al. |
| 9,189,821 B2 | 11/2015 | Nielson et al. |
| 10,175,350 B1 | 1/2019 | Tsokos et al. |
| 2003/0136249 A1 | 7/2003 | Inoue et al. |
| 2004/0107017 A1 | 6/2004 | Hoffmann et al. |
| 2006/0071664 A1 | 4/2006 | Fujiwara |
| 2011/0007076 A1 | 1/2011 | Nielson et al. |
| 2011/0279230 A1 | 11/2011 | Nielson et al. |
| 2011/0279476 A1 | 11/2011 | Nielson et al. |
| 2011/0283217 A1 | 11/2011 | Nielson et al. |
| 2011/0285749 A1 | 11/2011 | Nielson et al. |
| 2013/0135343 A1 | 5/2013 | Nielson et al. |
| 2013/0147637 A1 | 6/2013 | Nielson et al. |
| 2013/0170731 A1 | 7/2013 | Hirota |
| 2013/0174072 A9 | 7/2013 | Nielson et al. |
| 2015/0243054 A1 | 8/2015 | Nielson et al. |
| 2015/0332202 A1 | 11/2015 | Nielson et al. |
| 2015/0339516 A1 | 11/2015 | Yano et al. |
| 2017/0131426 A1 | 5/2017 | Sgarz et al. |
| 2017/0153349 A1 | 6/2017 | Krapf et al. |
| 2017/0153350 A1 | 6/2017 | Krapf et al. |
| 2017/0153356 A1 | 6/2017 | Zibold |
| 2018/0260669 A1 | 9/2018 | Konishi |
| 2019/0156137 A1 | 5/2019 | Nguyen et al. |
| 2022/0036042 A1* | 2/2022 | Takata ............... G06V 30/224 |
| 2022/0214437 A1* | 7/2022 | Mochizuki ............... G01S 7/06 |

FOREIGN PATENT DOCUMENTS

| | | |
|---|---|---|
| JP | H11-295045 A | 10/1999 |
| JP | 2000-310734 A | 11/2000 |
| JP | 2000-338255 A | 12/2000 |
| JP | 2003-098263 A | 4/2003 |
| JP | 2004-184286 A | 7/2004 |
| JP | 2005-517231 A | 6/2005 |
| JP | 2005-258821 A | 9/2005 |
| JP | 2006-153783 A | 6/2006 |
| JP | 2010-11210 A | 1/2010 |
| JP | 2013-140042 A | 7/2013 |
| JP | 2015-225234 A | 12/2015 |
| JP | 2017-040547 A | 2/2017 |
| JP | 2017-532528 A | 11/2017 |
| JP | 2019-185253 A | 10/2019 |
| JP | 2019-191927 A | 10/2019 |
| JP | 2020-154467 A | 9/2020 |
| JP | 2020-186994 A | 11/2020 |
| WO | 0002376 A1 | 1/2000 |

OTHER PUBLICATIONS

The Office Action (JPOA) issued on Oct. 31, 2023 in a counterpart Japanese patent application, with English translation.

Office Action issued on Jun. 7, 2023 in a related US patent application.

Office Action issued on Oct. 10, 2023 in a related Japanese patent application.

* cited by examiner

BURIED OBJECT TABLE

| BURIED OBJECT | WIDTH | THICKNESS |
|---|---|---|
| GROUND SILL | 120 | 120 |
| THROUGH-PILLAR | 120 | 120 |
| STAND PILLAR | 120 | 120 |
| STUD | 105 | 30 |
| BEAM | 105 | 150 |
| ... | ... | ... |
| BRACE | 90 | 90 |
| JOIST | 40 | 30 |
| FURRING STRIP | 45 | 18 |

FIG. 11

ACQUIRED DATA STORAGE TABLE

| TIME | X | Y | CAPACITANCE SENSOR | BURIED OBJECT DETERMINATION | BURIED OBJECT | SIZE |
|---|---|---|---|---|---|---|
| 0:00:00 | 1 | 1 | 500 | - | | - |
| 0:00:01 | 1 | 2 | 520 | - | | - |
| 0:00:02 | 1 | 3 | 520 | - | | - |
| 0:00:03 | 1 | 4 | 600 | - | | - |
| 0:00:05 | 2 | 4 | 640 | ○ | JOIST | 40 |
| 0:00:06 | 3 | 5 | 790 | ○ | JOIST | 40 |
| ... | ... | ... | ... | ... | | ... |
| 0:01:05 | 519 | 341 | 400 | - | | - |
| 0:01:06 | 520 | 340 | 340 | - | | - |

FIG. 12

DISPLAY BUFFER AREA

| X | Y | R | G | B |
|---|---|---|---|---|
| 1 | 1 | 255 | 255 | 255 |
| 1 | 2 | 255 | 255 | 255 |
| 1 | 3 | 255 | 255 | 255 |
| 1 | 4 | 255 | 255 | 255 |
| 1 | 5 | 125 | 125 | 125 |
| 1 | 6 | 120 | 120 | 120 |
| ... | ... | ... | ... | ... |
| 960 | 640 | 250 | 200 | 150 |
| 960 | 640 | 250 | 200 | 150 |

FIG. 13

SEARCH IMAGE STORAGE TABLE

| DATE | TIME | IMAGE DATA ID |
|---|---|---|
| 2020/9/18 | 9:50:00 | 200918_1.dat |
| 2020/9/18 | 10:00:00 | 200918_2.dat |
| 2020/9/18 | 11:00:00 | 200918_3.dat |
| 2020/9/20 | 9:00:00 | 200920_1.dat |
| 2020/9/22 | 8:50:00 | 200922_1.dat |
| ... | ... | ... |
| 2020/9/25 | 9:00:00 | 200925_1.dat |
| 2020/9/25 | 18:50:00 | 200925_2.dat |
| 2020/9/25 | 19:00:00 | 200925_3.dat |

FIG. 14

CONSTRUCTION INFORMATION

| NAME | PILLAR A | WIDTH 40mm | |
|---|---|---|---|
| STRENGTH | NUMBER | PITCH | SIZE |
| HIGH | 1 | — | M10 |
| MEDIUM | 1 | — | M8 |
| LOW | 2 | 15 | M4 |

DRAWING ID: 1

CONSTRUCTION INFORMATION REGISTRATION CONTENTS

| NO | NAME | WIDTH | HIGH STRENGTH | | | |
|---|---|---|---|---|---|---|
| | | | NUMBER | PITCH | SIZE | ... |
| 1 | PILLAR A | 40mm | 1 | - | M10 | ... |
| 2 | PILLAR B | 50mm | 1 | - | M10 | ... |
| 3 | PILLAR C | 80mm | 2 | 20 | M10 | ... |
| ... | ... | ... | ... | ... | ... | ... |

DIMENSIONAL INFORMATION MANAGEMENT DEVICE, DIMENSIONAL INFORMATION MANAGEMENT SYSTEM COMPRISING THE SAME, DIMENSIONAL INFORMATION MANAGEMENT METHOD, AND DIMENSIONAL INFORMATION MANAGEMENT PROGRAM

CROSS-REFERENCE TO RELATED APPLICATIONS

This application claims priority to Japanese Patent Application No. 2020-180402 filed on Oct. 28, 2020. The entire disclosure of Japanese Patent Application No. 2020-180402 is hereby incorporated herein by reference.

BACKGROUND

Technical Field

The present invention relates to a buried object scanning device for detecting a buried object such as metal or wood contained in a wall or concrete, for example, as well as a dimensional information management system comprising this device.

Description of the Related Art

In recent years, a device that detects buried objects on the basis of changes in reflected electromagnetic waves emitted toward the surface of concrete, for example, while being moved over the surface of the concrete, has been used as a device for detecting rebar and other such buried objects contained in concrete.

Patent Literature 1 discloses a buried object scanning device including an input unit for inputting data obtained by acquiring, along a side line, signal values of electromagnetic waves that have been reflected by a buried object; a generation unit for generating a virtual waveform template having a spread of the reflected waveforms according to the propagation depth of the electromagnetic waves; and a display unit for displaying both the signal values of the data and a virtual waveform template having a shape corresponding to the propagation depth.

CITATION LIST

Patent Literature

Patent Literature 1: JP-A 2017-040547

SUMMARY

However, the following problem is encountered with the above-mentioned conventional buried object scanning device.

With the buried object scanning device disclosed in the above-mentioned publication, when searching for a buried object, the worker has to perform marking, in which tape is affixed to the concrete surface to correspond to a first scanning range, a second scanning range, and side lines, and this increased the amount of work done by the worker.

It is an object of the present invention to provide a buried object scanning device with which search information about a buried object in a target can be effectively utilized, and the burden on the worker can be reduced, as well as a dimensional information management system comprising this device, a dimensional information management method, and a dimensional information management program.

The dimensional information management device according to the first invention manages dimensional information about a buried object included in a search image showing the presence or absence of a buried object in a target generated by a buried object scanning device scanned along the target, said dimensional information management device comprising an acquisition unit and a search information memory unit. The acquisition unit acquires search information including the search image from the buried object scanning device. The search information memory unit stores the search information acquired by the acquisition unit.

Here, in a dimensional information management device that manages dimensional information about a buried object by acquiring a search image showing the presence or absence of a buried object from a buried object scanning device that scans the surface of a target such as a wall surface or concrete to detect buried objects such as wood and metal contained in the target, the information including the search image acquired by the acquisition unit is stored as search information about the buried object.

Here, the dimensional information management device includes, for example, a PC (personal computer) used by a manager who manages a construction site, or a smartphone, tablet terminal, or the like owned by a worker.

In addition to the search image, the search information acquired from the buried object scanning device includes, for example, dimensional (width) information in the scanning direction of the buried object included in the search image, the distance from the scanning start point (reference point) to the buried object, the distance between buried objects, and other such information.

Consequently, the position, size, and so forth of a buried object can be ascertained, without having to perform marking work during construction, by utilizing the search information stored in the search image memory unit and displaying the search information on the display device, for example.

Also, a construction drawing showing the position of the buried object in the target, screwing positions, and other such construction positions can be produced on the basis of the search information stored in the search image memory unit.

As a result, the construction work can be performed on the basis of the position, size, and so forth of buried objects included in the target, which lessens the burden on the workers.

The dimensional information management device according to the second invention is the dimensional information management device according to the first invention, further comprising a search information and a first display control unit. The search information call-up unit calls up arbitrary information from the search information stored in the search information memory unit. The first display control unit causes a first display unit to display the search information called up by the search information call-up unit.

Consequently, by causing the first display unit to display search information such as a search image called up from the search information memory unit, a worker, supervisor, or the like who performs construction can easily check the position and size of buried objects contained an actual target while checking the search information.

The dimensional information management device according to the third invention is the dimensional information management device according to the second invention, wherein the first display control unit controls the first display unit so as to display position information about the buried object, whose origin is the starting point of the scan included in the search image, as the search information.

Consequently, where a buried object is located with respect to an actual target can be easily checked by a worker or the like by causing the first display unit to display the position and size of the buried object, using the reference point at which the scanning of the buried object scanning device is started as a reference point.

The dimensional information management device according to the fourth invention is a dimensional information management device according to any of the first to third inventions, further comprising an input unit to which construction information including position information about the buried object in the target is inputted.

Here, the construction information inputted to the input unit includes, for example, dimensional information about the position and size of the buried objects contained in the target, the screwing positions into the buried object to be constructed, the type and size of screws, and so on.

Consequently, the construction information inputted to the input unit can be compared with the search information stored in the search information memory unit to see whether the search information matches the construction information before the construction is carried out.

The dimensional information management device according to the fifth invention is the dimensional information management device according to the fourth invention, further comprising a collation unit that collates the search information stored in the search information memory unit with the construction information inputted to the input unit, and determines whether or not there is a match.

Consequently, if the result of collation between the search information stored in the search information memory unit and the construction information inputted to the input unit is that there is a match, the construction work can be carried out using this search information and construction information.

The dimensional information management device according to the sixth invention is the dimensional information management device according to the fifth invention, wherein the collation unit collates the search information with the construction information by using the scanning starting point included in the search image as a reference point.

Consequently, the search information and the construction information can be compared using the scanning start point included in the search image and the reference point attached to the target as a reference, making it easy to determine whether or not the two match.

The dimensional information management device according to the seventh invention is the dimensional information management device according to the fifth or sixth invention, wherein the collation unit collates the search information with the construction information by using dimensional information related to the buried object.

Consequently, the position and size of the buried object can be compared by using the dimensions (width) in the scanning direction of the buried object included in the search information and the dimensional information about the buried object included in the construction information, which makes it easy to determine whether or not the two match.

The dimensional information management device according to the eighth invention is the dimensional information management device according to the fifth or sixth invention, wherein the collation unit collates the search information with the construction information by subjecting the search image including the buried object to pattern matching with drawings included in the construction information.

Consequently, the search image including the buried object included in the search information and the drawing included in the construction information are subjected to pattern matching, and the position and size of the buried object are compared, which makes it easy to determine whether or not there is a match.

The dimensional information management device according to the ninth invention is the dimensional information management device according to any of the fifth to eighth inventions, further comprising a construction drawing creation unit that creates a construction drawing on the basis of the search information and the corresponding construction information if the search information matches the construction information as a result of collation by the collation unit.

Here, the construction drawing created by the construction drawing creation unit indicates, for example, the positions where screws other such construction materials are to be installed with respect to the buried object that is the object of construction, in a drawing showing the position of the buried object in the target that has been determined to be substantially the same as the search information.

Consequently, a construction drawing created by matching search information and construction information can be used to carry out construction work on an actual target with respect to the buried object.

The dimensional information management device according to the tenth invention is the dimensional information management device according to the ninth invention, wherein the first display control unit controls the first display unit so as to display a construction drawing in which construction information including position information for the buried object in the target is reflected in the search information.

Consequently, a worker can look at the display screen of the first display unit, on which is displayed a construction drawing in which the construction information is reflected in the search image, and can perform the construction work without having to mark the target (wall surface, etc.).

The dimensional information management device according to the eleventh invention is the dimensional information management device according to any of the fourth to tenth inventions, wherein the construction information includes information about at least one of the following: the name and dimensions of the buried object that is the target, and the position, type, pitch, and number of screws to be used.

Consequently, construction information, including the name and dimensions of the buried object where construction is to be performed, the position, type, pitch, and number of screws to be installed, etc., can be used to collate with the search image and reflect this information in the search image.

The dimensional information management system according to the twelfth invention comprises the dimensional information management device according to any of the first to eleventh inventions, and a buried object scanning device, which includes a data transfer unit that transfers a search image to the acquisition unit of the dimensional information management device.

Consequently, a search image can be saved as search information in the dimensional information management device that has received the search image from the data transfer unit of the buried object scanning device.

The dimensional information management system according to the thirteenth invention is the dimensional information management system according to the twelfth invention, wherein the buried object scanning device has a detection unit that detects the presence or absence of the buried object, a search image conversion processing unit that converts the detection result from the detection unit into the search image, a memory unit that stores the search image and a grid layer including grid lines corresponding to a predetermined scale, and a second display unit that displays the search image and the grid layer.

Consequently, in a buried object scanning device that detects buried objects such as wood and rebar contained in a target such as a wall or concrete, for example, a search image converted from the detection result in the detection unit and a grid layer including grid lines can be displayed on the second display unit in a state of being superimposed.

The dimensional information management system according to the fourteenth invention is the dimensional information management system according to the thirteenth invention, wherein the buried object scanning device further has an operation input unit to which various operations are inputted, and a second display control unit that controls the second display unit so that the search image and the grid layer are displayed superimposed, and the search image is displayed in a state of being able to move relative to the grid layer in response to input to the operation input unit.

Consequently, in a buried object scanning device, a search image can be displayed in a state of being able to move relative to the grid layer in response to input to the operation input unit.

Therefore, the spacing between the grid lines can be checked by moving the search image and the grid layer relative to each other so that the position serving as the reference point is aligned with the grid lines, for example, which makes it easy to check the distance from the position serving as the reference point to the position of the buried object on the display screen of the display unit, without having to make any markings on the wall surface.

As a result, no marking work is required during a search for buried objects, and the burden on the worker can be reduced.

The dimensional information management method according to the fifteenth invention is a method for managing dimensional information about a buried object included in a search image indicating the presence or absence of the buried object in a target generated by a buried object scanning device scanned along the target, said method comprising an acquisition step and a search information storage step. The acquisition step involves acquiring search information including the search image from the buried object scanning device. The search information storage step involves storing the search information acquired in the acquisition step.

Here, in a dimensional information management method for managing dimensional information about buried objects by acquiring a search image showing the presence or absence of a buried object from a buried object scanning device that scans the surface of a target such as a wall surface or concrete to detect buried objects such as wood and metal contained in the target, information including the search image acquired in the acquisition step is stored as search information about the buried object.

Here, in a dimensional information management method, a personal computer (PC) used by a manager who manages a construction site, or a smartphone, tablet terminal, or the like owned by a worker, for example, is used as a dimensional information management device.

The search information acquired from the buried object scanning device includes, for example, a search image, as well as dimensional (width) information in the scanning direction of the buried object included in the search image, and information such as the distance from the scanning start point (reference point) to a buried object, and the distance between buried objects.

Consequently, search information saved in the search image storage step can be utilized, and the search information can be displayed on the display device, for example, allowing the position and size of the buried object to be ascertained without having to make any markings during construction work.

Also, a construction drawing showing the position of a buried object in the target and the installation positions of screws as the like can be created on the basis of the search information saved in the search image storage step.

As a result, the construction work can be performed on the basis of the position and size of any buried objects contained in the target, so the burden on the worker can be reduced.

The dimensional information management program according to the sixteenth invention causes a computer to execute a dimensional information management method for managing dimensional information about a buried object included in a search image showing the presence or absence of the buried object in a target generated by a buried object scanning device scanned along the target, said method comprising an acquisition step and an search information storage step. In the acquisition step, search information including search images is acquired from the buried object scanning device. In the search information storage step, the search information acquired in the acquisition step is stored.

Here, in a dimensional information management program that manages dimensional information about a buried object by acquiring a search image showing the presence or absence of a buried object from a buried object scanning device that scans the surface of a target such as a wall surface or concrete to detect buried objects such as wood and metal contained in the target, the information including search images acquired in the acquisition step is saved as search information about the buried object.

Here, with a dimensional information management method, for example, a personal computer (PC) used by a manager who manages a construction site, or a smartphone, tablet terminal, or the like owned by a worker, for example, is used as a dimensional information management device.

The search information acquired from the buried object scanning device includes, for example, search images, as well as dimensional (width) information in the scanning direction of the buried object included in the search image, and information such as the distance from the scanning start point (reference point) to the buried object, and the distance between buried objects.

Consequently, the position, size, and so forth of a buried object can be ascertained, without having to perform marking work during construction, by utilizing the search information stored in the search image memory unit and displaying the search information on the display device, for example.

Also, a construction drawing showing the position of the buried object in the target, screwing positions, and other such construction positions can be produced on the basis of the search information stored in the search image storage step.

As a result, the construction work can be performed on the basis of the position, size, and so forth of buried objects included in the target, which lessens the burden on the workers.

Effects

With the dimensional information management device according to the present invention, construction work can be performed on the basis of the position, size, and so forth of buried objects contained in the target, so the burden on the worker can be reduced.

BRIEF DESCRIPTION OF THE DRAWINGS

FIG. 11 is a diagram showing a buried object table stored in the memory unit of the buried object scanning device in FIG. 3;

FIG. 12 is a diagram showing the acquisition data storage table stored in the memory unit of the buried object scanning device in FIG. 3;

FIG. 13 is a diagram showing the display buffer area stored in the memory unit of the buried object scanning device in FIG. 3;

FIG. 14 is a diagram showing the search image storage table stored in the memory unit of the buried object scanning device in FIG. 3;

DETAILED DESCRIPTION

The dimensional information management system 1 including the dimensional information management device 40 according to an embodiment of the present invention will now be described with reference to FIGS. 1 to 33.

(1) Configuration of Dimensional Information Management System 1

Figure 1:
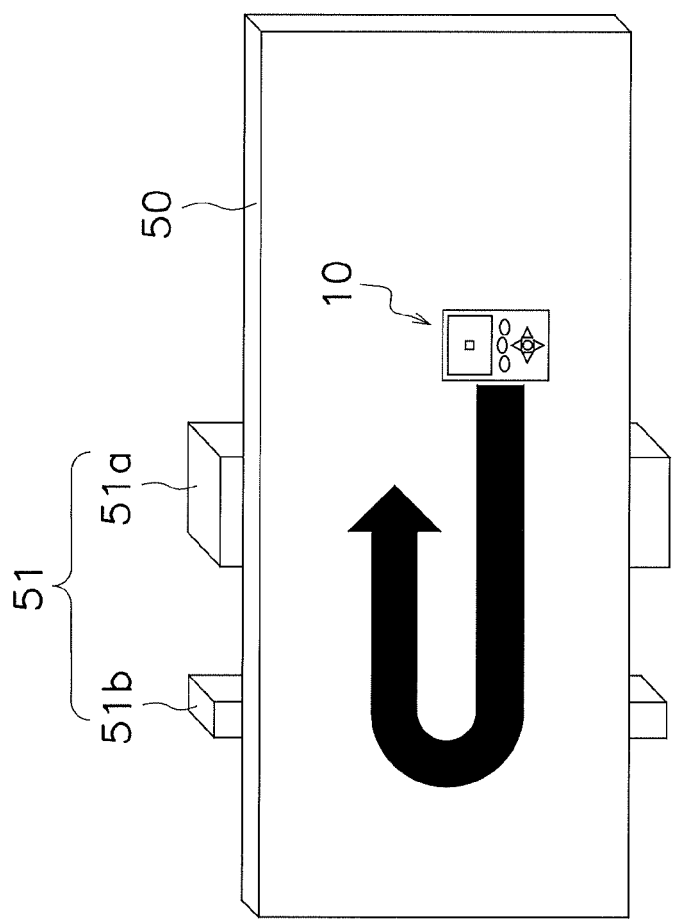
FIG. 1 is a diagram showing the state when a buried object scanning device is scanned along a wall surface in order to detect buried objects in the wall surface by using the buried object scanning device included in the dimensional information management system according to an embodiment of this invention.
Figure 3:
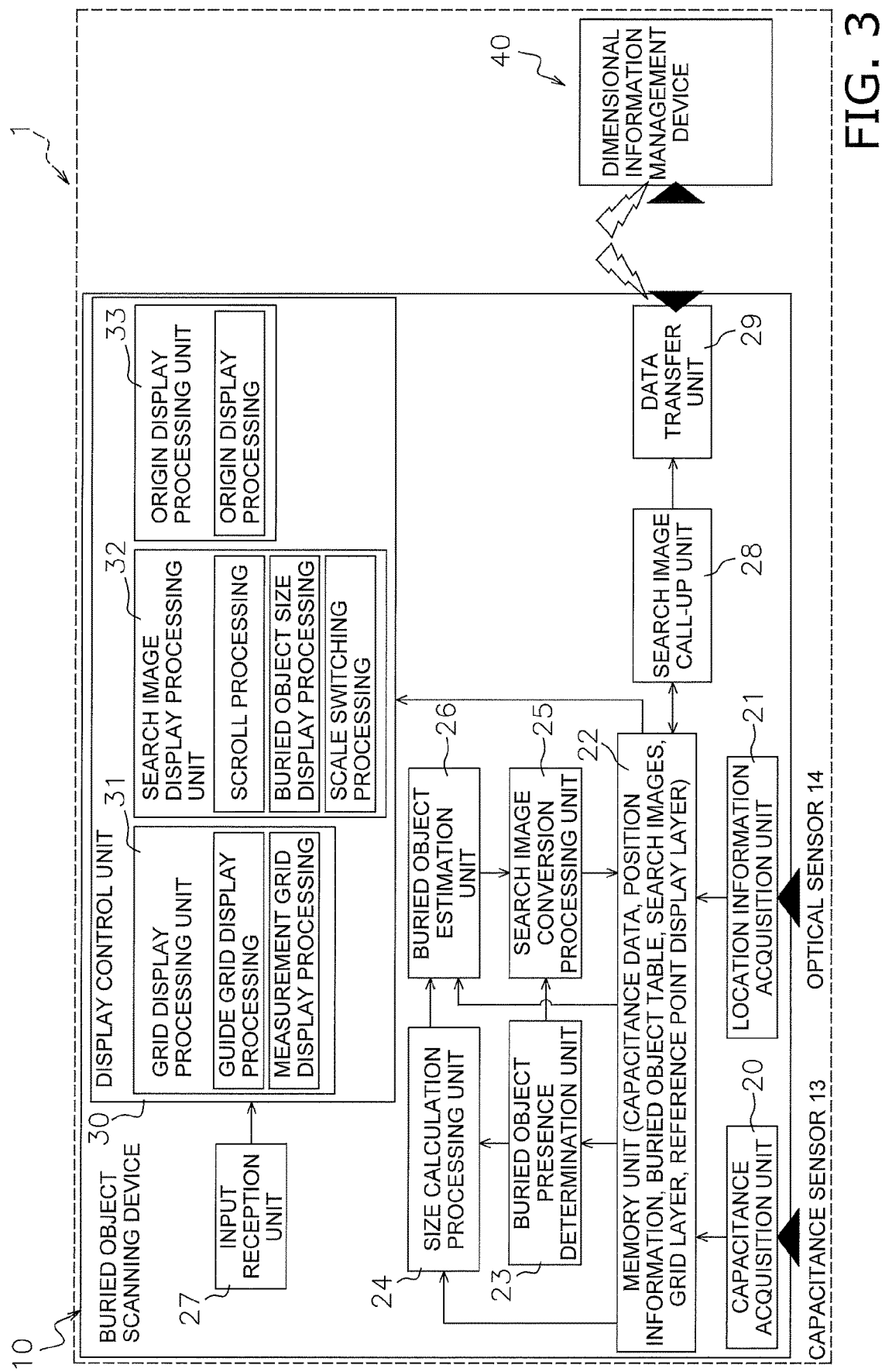
FIG. 3 is a control block diagram showing the internal configuration of the buried object scanning device included in the dimensional information management system in FIG. 1.
Figure 25:
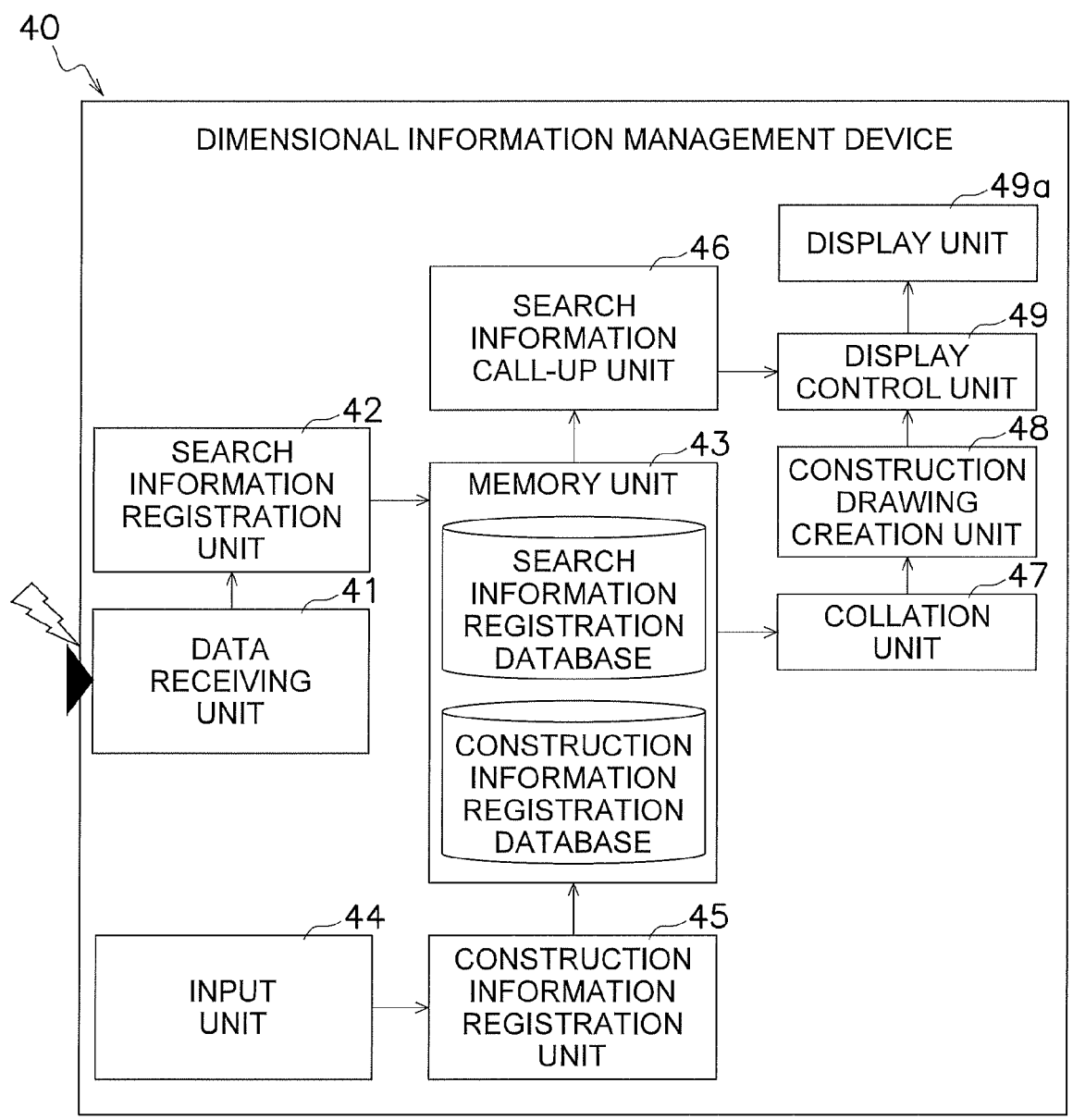
FIG. 25 is a control block diagram showing the internal configuration of the dimensional information management device included in the dimensional information management system in FIG. 1.

As shown in FIG. 1, the dimensional information management system 1 according to this embodiment comprises a buried object scanning device 10 and a dimensional information management device 40 (see FIGS. 3, 25, etc.).

The buried object scanning device 10 moves along a wall surface (target) 50 while detecting changes in capacitance with a capacitance sensor 13 (see FIG. 3; discussed below), thereby detecting buried objects 51 such as wood (pillars 51a and studs 51b), metal, or the like contained in the wall surface 50.

As shown in FIG. 3, the dimensional information management device 40 is able to communicate with the buried object scanning device 10, receives search information about the buried object 51 in the wall surface 50 from the buried object scanning device 10, and manages dimensional information such as the position and size of the buried object 51.

(2) Configuration of Buried Object Scanning Device 10

Figure 2:
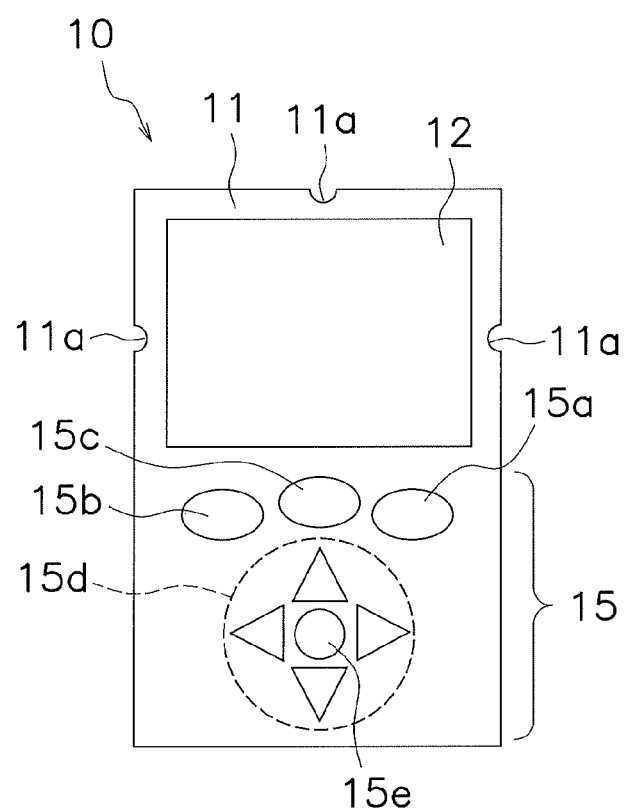
FIG. 2 is an external view of the configuration of the buried object scanning device in FIG. 1.

As shown in FIG. 2, the buried object scanning device 10 comprises a main body 11, a display unit (second display unit) 12, a capacitance sensor 13 (see FIG. 3), an optical sensor 14 (see FIG. 3), and an operation input unit 15.

The wall surface 50 includes, for example, wallpaper or other such decorative material applied to drywall or a plywood surface. Also, the buried object 51 includes, for example, columns, beams, braces, and other such wood or metal frames.

As shown in FIG. 2, the main body 11 is a resin member having a substantially cuboid shape, and the display unit 12 and e operation input unit 15 are provided on the side (front) facing the user during use. The capacitance sensor 13 and the optical sensor 14 are provided on the side (back) that is on the wall surface 50 side (the opposite side from the user).

Recesses 11a are provided on the upper end surface and the left and right end surfaces of the main body 11. These recesses 11a are used for marking the scanning start point on the wall surface 50 with a pen or the like when scanning the wall surface 50 with the buried object scanning device 10, for example.

As shown in FIG. 2, the display unit 12 is a liquid crystal display device, for example, and is disposed on the front of the main body 11. The display unit 12 displays, for example, the settings of the buried object scanning device 10, a search image showing the detection result of the buried object 51, so forth, and what is displayed is switched according to the operation content inputted to the operation input unit 15.

The capacitance sensor 13 is disposed on the back of the main body 11, and is a sensor that senses changes in capacitance when the buried object scanning device 10 is moved along the wall surface 50, and is used to detect a buried object 51 located within the wall surface 50.

The optical sensor 14 is disposed on the back of the main body 11, and receives reflected infrared light emitted onto the wall surface 50, for example, to acquire position information about the buried object scanning device 10.

As shown in FIG. 2, the operation input unit 15 is disposed on the front of the main body 11. The operation input unit 15 includes a power button 15a, a grid display button 15b, a scale switching button 15c, a D-pad (Direction pad) 15d, and an enter button 15e.

The power button 15a is disposed on the upper-right side of the operation input unit 15. For example, holding this button down turns the power of the buried object scanning device 10 on or off.

The grid display button 15b is disposed on the upper-left side of the operation input unit 15, and is pressed when a grid layer, in which a plurality of grid lines (discussed below) are arranged in a grid pattern, is displayed superimposed with the search image on the display screen 12a of the display unit 12. Also, when the grid display button 15b is pressed again in a state in which the grid layer is superimposed with the search image and displayed on the display screen 12a, a measurement grid (grid lines) is displayed on the display screen 12a.

The scale switching button 15c is disposed in the upper center part of the operation input unit 15, and is pressed, for example, when the superimposed display of the search image and the grid layer is enlarged.

The D-pad 15d is disposed at the lower part of the operation input unit 15, and allows operations to be inputted in four directions: up, down, left, and right. When the D-pad 15d is operated up, down, left, or right in a state in which the grid layer including the grid lines is superimposed with the search image, for example, the search image is moved relative to the grid layer.

The enter button 15e is disposed in the center position of the D-pad 15d, and is pressed when executing a command or the like selected using the D-pad 15d, etc.

Also, as shown in FIG. 3, the buried object scanning device 10 comprises a capacitance acquisition unit 20, a position information acquisition unit 21, a memory unit 22, a buried object presence determination unit 23, a size calculation processing unit 24, a search image conversion processing unit 25, a buried object estimation unit 26, an input reception unit 27, a search image call-up unit 28, a data transfer unit 29, and a display control unit 30, all provided inside the main body 11.

The capacitance acquisition unit 20, the position information acquisition unit 21, the memory unit 22, the buried object presence determination unit 23, the size calculation processing unit 24, the search image conversion processing unit 25, the object estimation unit 26, the input reception unit 27, the search image call-up unit 28, the data transfer unit 29, and the display control unit 30 provided inside the buried object scanning device 10 are generated when the CPU reads various control programs stored in the memory.

The capacitance acquisition unit 20 acquires the output from the capacitance sensor 13 disposed on the rear side of the main body 11, and transmits this output to the memory unit 22.

More precisely, the capacitance acquisition unit 20 senses changes in capacitance in order to determine if the buried object 51 is present within the range of movement every time the buried object scanning device 10 reaches a specific movement amount along the wall surface 50, using the position information acquired by the position information acquisition unit 21. Consequently, the search image conversion processing unit 25 (discussed below) can generate a search image in the movement area for each specific movement amount by using the output results from the capacitance sensor 13.

The position information acquisition unit 21 acquires the output from the optical sensor 14 disposed on the rear side of the main body 11, and transmits this output to the memory unit 22. Consequently, the buried object scanning device 10 can sense the position on the wall surface 50 and the amount of movement on the basis of the position information acquired by the position information acquisition unit 21.

The memory unit 22 stores the capacitance data received from the capacitance acquisition unit 20, the position information data received from the position information acquisition unit 21, a buried object table (see FIG. 11) including information about the size the buried object 51 in the scanning direction of the buried object scanning device 10, search images converted from the capacitance data in the search image conversion processing unit 25, a grid layer displayed superimposed with a search image, a reference point display layer, and the like. The memory unit 22 transmits a search image called up by the search image call-up unit 28, etc., to the data transfer unit 29 and the display control unit 30.

The search images stored in the memory unit 22 are stored together with information about the time at which the wall surface 50 was scanned, in a state of being grouped in units of one scan. In this embodiment, search images corresponding to a plurality of scans are stored in the memory unit 22.

Also, search images converted for each specific movement amount are accumulated and stored after the power is turned on to the buried object scanning device 10, and a plurality of search images are stored in a state of being grouped in units of a single scan.

The buried object presence determination unit 23 determines whether a buried object 51 is present in the wall surface 50 (edge determination processing) according to whether or not the output signal (capacitance data) of the capacitance sensor 13 has exceeded a specific threshold value. This makes it possible to determine whether a buried object 51 is present on the basis of the output result of the capacitance sensor 13.

The size calculation processing unit 24 calculates an estimated value of the size (width, etc.) of the buried object 51 in the wall surface 50 on the basis of the output signal (capacitance data) of the capacitance sensor 13. More specifically, the size calculation processing unit 24 detects the edge portions at both ends where the output signal of the capacitance sensor 13 has changed, and calculates the estimated value of the size with the space between the edges as the buried object 51.

The search image conversion processing unit 25 converts the output signal of the capacitance sensor 13 into a search image indicating the presence or absence of a buried object 51. More precisely, the search image conversion processing unit 25 generates a search image by using the capacitance data acquired each time the amount of movement of the buried object scanning device 10 along the wall surface 50 reaches a specific distance, on the basis of the position information for the buried object scanning device 10 sensed by the above-mentioned position information acquisition unit 21.

The buried object estimation unit 26 compares the estimated value of the size (width) of the buried object 51 in the scanning direction calculated by the size calculation processing unit 24, with the width of each type of buried object 51 included in the buried object table (see FIG. 11) stored in the memory unit 22, and estimates the corresponding type of the buried object 51.

The input reception unit 27 receives user operations inputted to the operation input unit 15, including the above-mentioned power button 15a, the grid display button 15b, the scale switching button 15c, the D-pad 15d, etc.

The search image call-up unit 28 calls up a search image stored in the memory unit 22 on the basis of the user operation inputted to the operation input unit 15, for example, and transmits this image to the data transfer unit 29 or the display control unit 30.

The display control unit 30 may control the display unit 12 so that after a search image is stored in the memory unit 22, it is displayed in real time during scanning, regardless of the operation inputted by the user to the operation input unit 15.

As shown in FIG. 3, the data transfer unit 29 transmits search images, the detection result for a buried object 51, and other such search information to the dimensional information management device 40, such as a smartphone or the like owned by a worker, etc.

Although FIG. 3 shows that the search information is transmitted from the data transfer unit 29 of the buried object scanning device 10 to the single dimensional information management device 40, there may be a plurality of dimensional information management devices 40 to which search information is transmitted from the data transfer unit 29 of the buried object scanning device 10.

The display control unit 30 causes the display screen 12a of the display unit 12 to display a search image (see FIG. 4, etc.) indicating the presence or absence of a buried object 51 generated by the search image conversion processing unit 25 as described above. Furthermore, the display control unit 30 causes the display screen 12a of the display unit 12 to display the search image superimposed with the grid layer and the reference point display layer stored in the memory unit 22.

Figure 4:
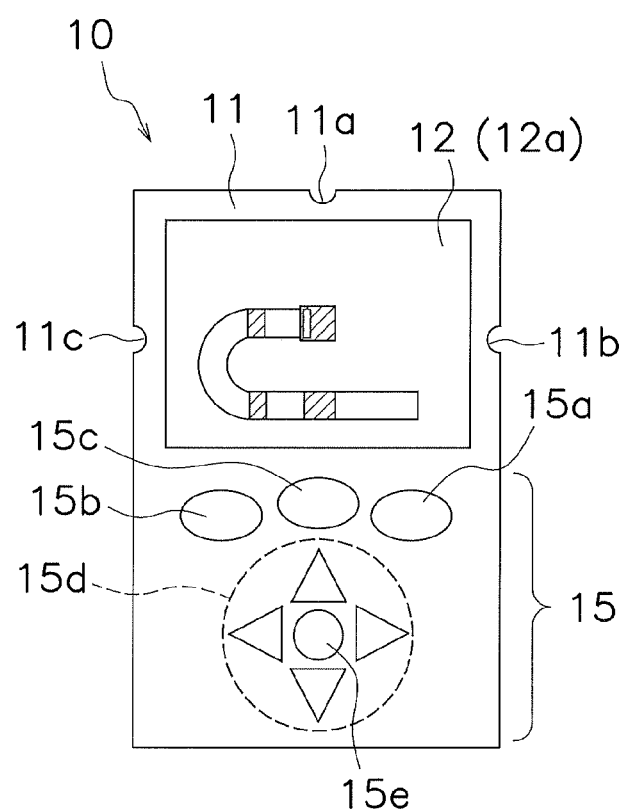
FIG. 4 is a diagram showing the display screen of the display unit when the buried object scanning device in FIG. 3 is scanned over a wall surface.

In a search image, as shown in FIG. 4, a plurality of search images generated from the capacitance data acquired along the path of the buried object scanning device 10 scanned over the wall surface 50 are combined to display whether or not a buried object 51 is present.

As shown in FIG. 3, the display control unit 30 also has a grid display processing unit 31, a search image display processing unit 32, and an origin display processing unit 33.

The grid display processing unit 31 performs display processing so that a grid layer including a plurality of grid lines, or a grid layer including a measurement grid (grid lines) prepared for displaying the size of the buried object 51, the distance to the buried object 51, and so forth in an easy-to-understand manner, is superimposed on the search image.

The search image display processing unit 32 performs scroll processing to move the search image with respect to the grid layer (fixed display) on the display screen 12a of the display unit 12, and displays on the display screen 12a the size of the buried object 51 included in the search image. Furthermore, the search image display processing unit 32 performs processing to switch the display scale of the search image displayed on the display screen 12a.

The origin display processing unit 33 performs processing to display a reference point P1 on the grid layer displayed superimposed with the search image on the display screen 12a.

The grid layer is a display layer (see FIG. 20A, etc.) including a plurality of grid lines arranged in a grid pattern, and is displayed superimposed on a search image showing whether or not a buried object 51 is present. The display control unit 30 causes the display unit 12 to display the search image in a state of being movable with respect to the grid layer.

In the reference point display layer, for example, the reference point P1 (see FIG. 18, etc.) indicating the scanning start point is displayed on the display screen 12a of the display unit 12, superimposed on the search image and the grid layer. The reference point display layer is displayed superimposed on the search image and the grid layer in a state of being able to move with respect to the grid layer (fixed display), similarly to the search image (see FIG. 20B).

The display control of the display unit 12 by the display control unit 30 will be described in detail below.
Generation to Storage of Search Images With the buried object scanning device 10 in this embodiment, the wall surface 50 is scanned with the above configuration, and as a result, a search image indicating the presence or absence of a buried object 51 in the wall surface 50 is generated on the basis of the change in capacitance thus obtained.

Figure 5:
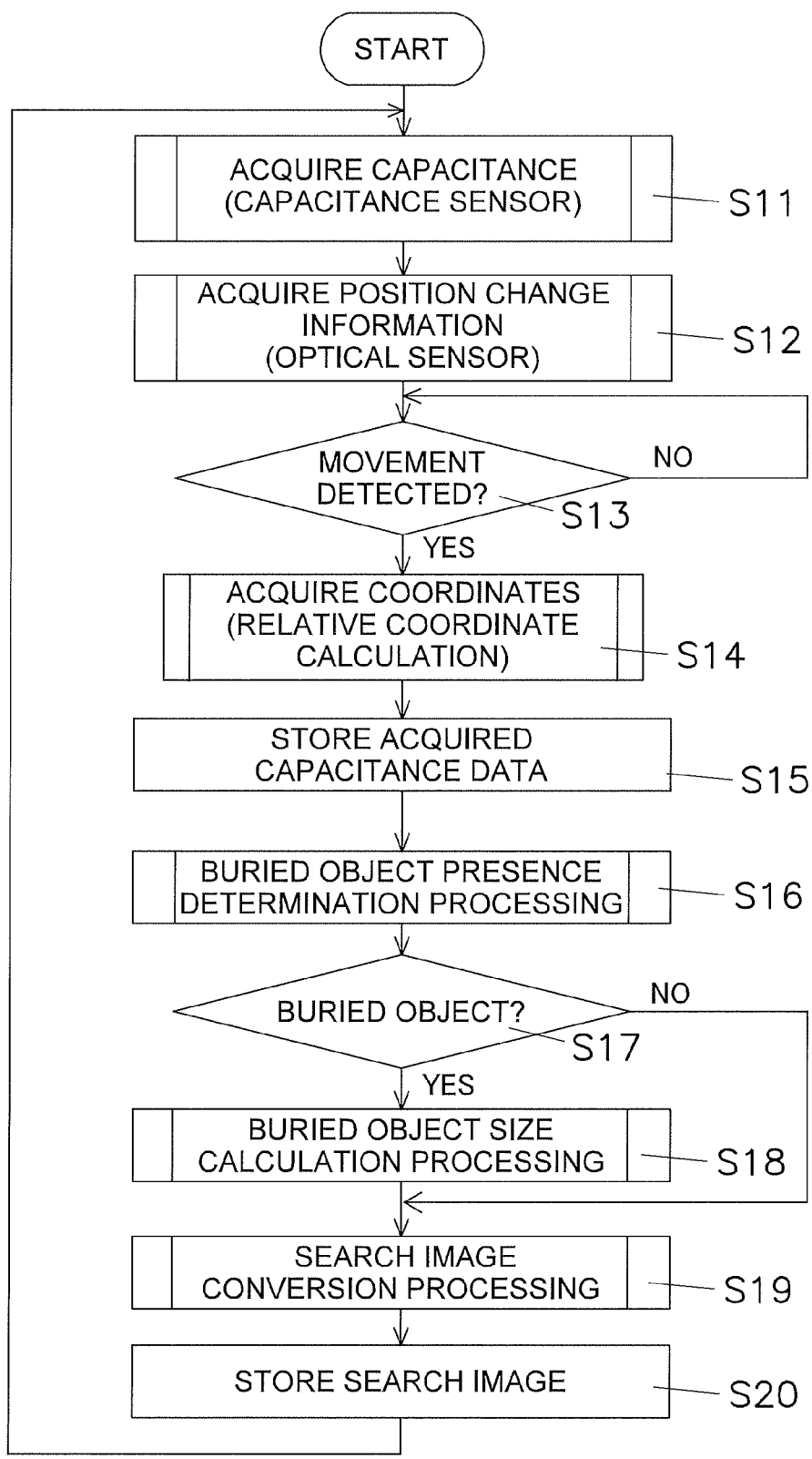
FIG. 5 is a flowchart showing the flow of search image generation and storage processing in the buried object scanning device in FIG. 3.

Here, the processing to generate a search image will be described below using the flowchart in FIG. 5.

In step S11, the capacitance acquisition unit 20 acquires the capacitance sensed by the capacitance sensor 13.

Next, in step S12, the position information acquisition unit 21 acquires the position information about the buried object scanning device 10 sensed by the optical sensor 14.

Next, in step S13, it is determined, from the position information about the buried object scanning device 10 acquired by the position information acquisition unit 21, whether or not the buried object scanning device 10 has moved along the wall surface 50. If it is determined that the device has moved, the processing proceeds to step S14, and if it is determined that the device has not moved, step S13 is repeated until it is determined that the device has moved.

Next, in step S14, since it was determined in step S13 that the buried object scanning device 10 has moved, the coordinates (relative coordinates) indicating the current position of the buried object scanning device 10 are calculated and acquired.

Next, in step S15, the coordinates of the current position of the buried object scanning device 10 calculated and acquired in step S14 are calculated and acquired as relative coordinates, and the processing proceeds to step S16.

Consequently, for example, every time the position information acquisition unit 21 detects that the position of the buried object scanning device 10 sensed by the optical sensor 14 has reached a specific movement amount, the capacitance data acquired by the capacitance acquisition unit 20 can be saved.

Next, in step S16, the buried object presence determination unit 23 performs processing to determine whether or not a buried object 51 is present in the scanning range on the basis of the acquired capacitance data.

Next, in step S17, the presence determination unit 23 determines whether or not a buried object 51 is present, and if there is one, the processing proceeds to step S18, and if not, the processing proceeds to step S19.

Next, in step S18, since it was determined in step S17 that there is a buried object 51, the size calculation processing unit 24 calculates the estimated value of the size (width) of the buried object 51 in the scanning direction of the buried object scanning device 10.

Next, in step S19, the search image conversion processing unit 25 performs processing to convert the capacitance data acquired by the capacitance acquisition unit 20 into a search image, regardless of the presence or absence of a buried object 51.

Next, in step S20, the search image generated in step S19 is stored in the memory unit 22.

In this embodiment, a search image is generated using the capacitance data sensed by the capacitance sensor 13 and is stored in the memory unit 22 in the above steps.
From Start of Scanning to Image Storage Next, the steps from the start of scanning along the wall surface 50 to the storage processing of the search image in the buried object scanning device 10 of this embodiment will be described using the flowcharts in FIGS. 6 to 10.

(a) Coordinate Acquisition Processing

The coordinate acquisition processing in S14 of FIG. 5 performed by the buried object scanning device 10 in this embodiment will now be described in detail with reference to the flowchart of FIG. 6.

Figure 6:
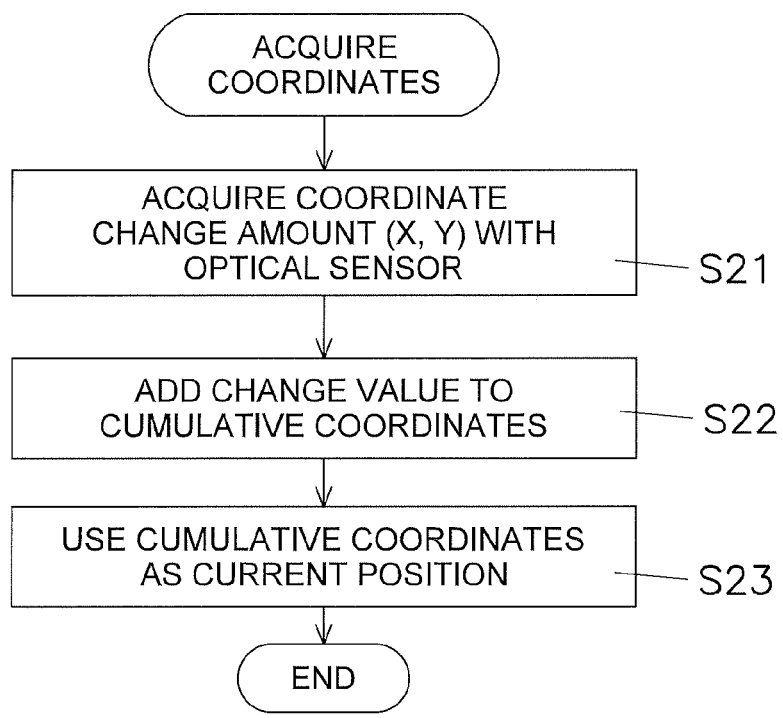
FIG. 6 is a flowchart showing the flow of the coordinate acquisition processing during scanning with the buried object scanning device in FIG. 3.

In this embodiment, when scanning along the wall surface 50 is started with the buried object scanning device 10, in step S21 the position information sensed by the optical sensor 14 is acquired as a coordinate change amount (X, Y), as shown in FIG. 6.

Next, in step S22, the coordinate change amount acquired in step S21 is added to the cumulative coordinates.

Next, in step S23, the cumulative coordinates obtained in step S22 are set as the current position of the buried object scanning device 10.

(b) Buried Object Presence Determination Processing

The processing to determine the presence of a buried object 51 in S17 of FIG. 5 performed by the buried object scanning device 10 in this embodiment will now be described in detail with reference to the flowchart of FIG. 7.

First, in step S31, the amount of change in the sensed result of the capacitance sensed by the capacitance sensor 13 is calculated as a determination value.

Next, in step S32, it is determined whether or not the determination value is equal to or greater than a specific threshold value. If the determination value is equal to or greater than the specific threshold value, the processing proceeds to step S33, and otherwise the processing proceeds to step S34.

Next, in step S33, since it was determined in step S32 that the determination value is equal to or greater than a specific threshold value, it is determined that there is a buried object 51 in the scanning area, and the processing ends.

On the other hand, in step S34, since it was determined in step S32 that the determination value is less than the specific threshold value, it is determined that there is no buried object 51 in the scanning area, and the processing ends.

(c) Buried Object Estimation Processing

Figure 8:
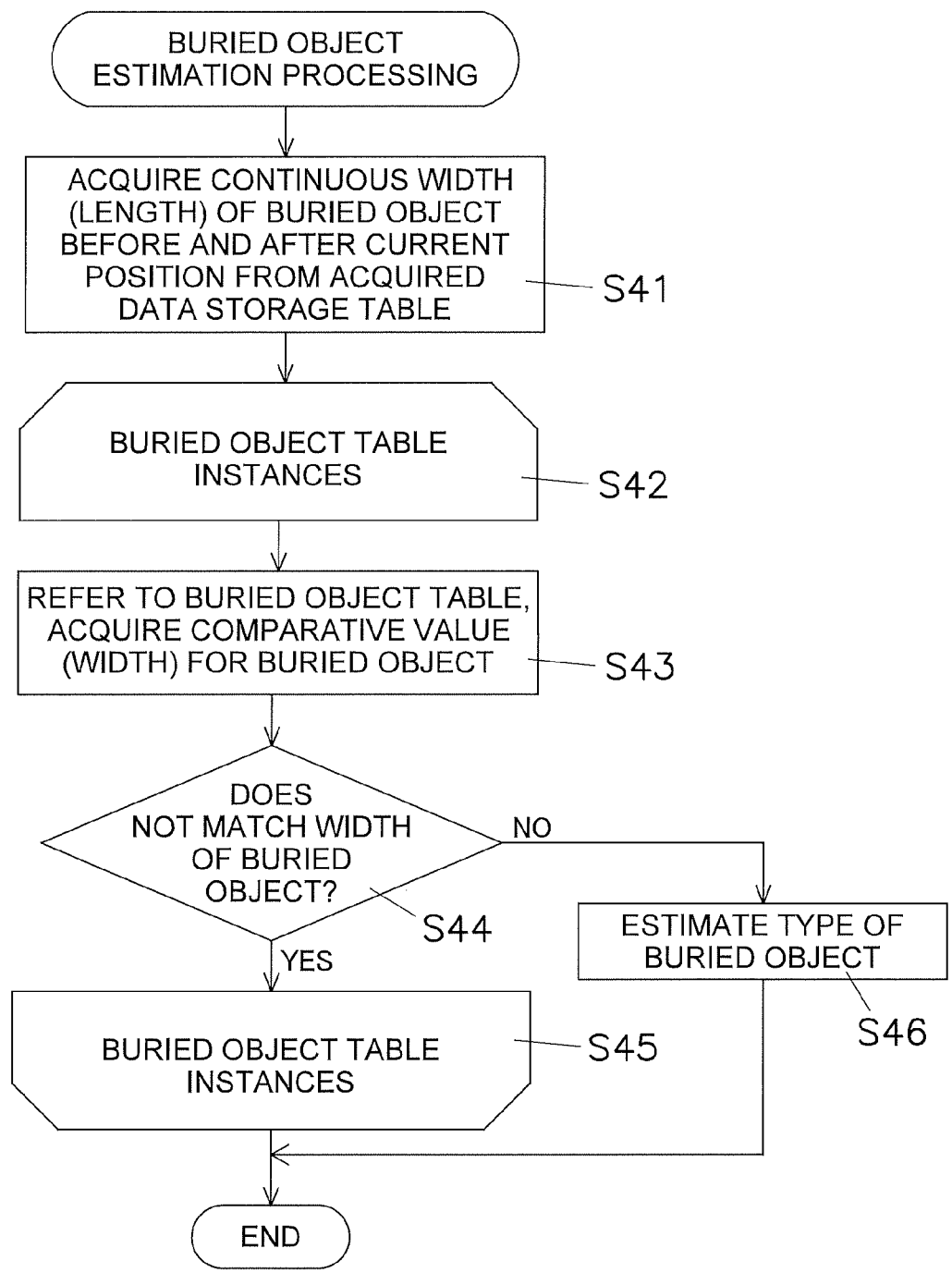
FIG. 8 is a flowchart showing the flow of processing to estimate a buried object included in the search image with the buried object scanning device in FIG. 3.

The processing to estimate the buried object 51 in S18 of FIG. 5 carried out by the buried object scanning device 10 in this embodiment will now be described in detail with reference to the flowchart of FIG. 8.

First, in step S41, the continuous width (length) in the scanning direction of the buried object 51 before and after the current position of the buried object scanning device 10 is acquired from the acquired data storage table shown in FIG. 12.

Here, as shown in FIG. 12, the acquired data storage table includes information about the acquisition time, the coordinates (X, Y), the sensed result from the capacitance sensor, the result of determining a buried object, the type of buried object, and the size.

The type of buried object included in the acquired data storage table shown in FIG. 12 is acquired as follows. Out of information about the name, width, and thickness for each type of the buried object 51 shown in FIG. 11, the width is referred to, this width is compared to the estimated size of the sensed buried object, and the result is the estimated type of the buried object 51.

Next, in the processing of steps S42 to S46, the buried object table shown in FIG. 11 is referred to (S43), and the material (ground sill, through-pillar, stand pillar, stud, beam, brace, joist, furring strip, etc.) matching the continuous width (length) of the buried object 51 in the scanning direction as acquired in step S41 is repeatedly checked a number of times equal to the number of pieces of material (S44).

Then, in step S44, if the width is substantially the same as that of any of the buried objects 51 included in the buried object table, the processing proceeds to step S46 and the type of buried object 51 is estimated. Then, the buried object table is put back so as to reflect the estimation result, and the processing is ended.

On the other hand, in step S44, if the width is not the same as that of any of the buried objects 51 included in the buried object table, the processing of steps S42 to S46 is repeated until all the types in the buried object table have been checked, and the processing is ended.

(d) Search Image Conversion Processing

Figure 9:
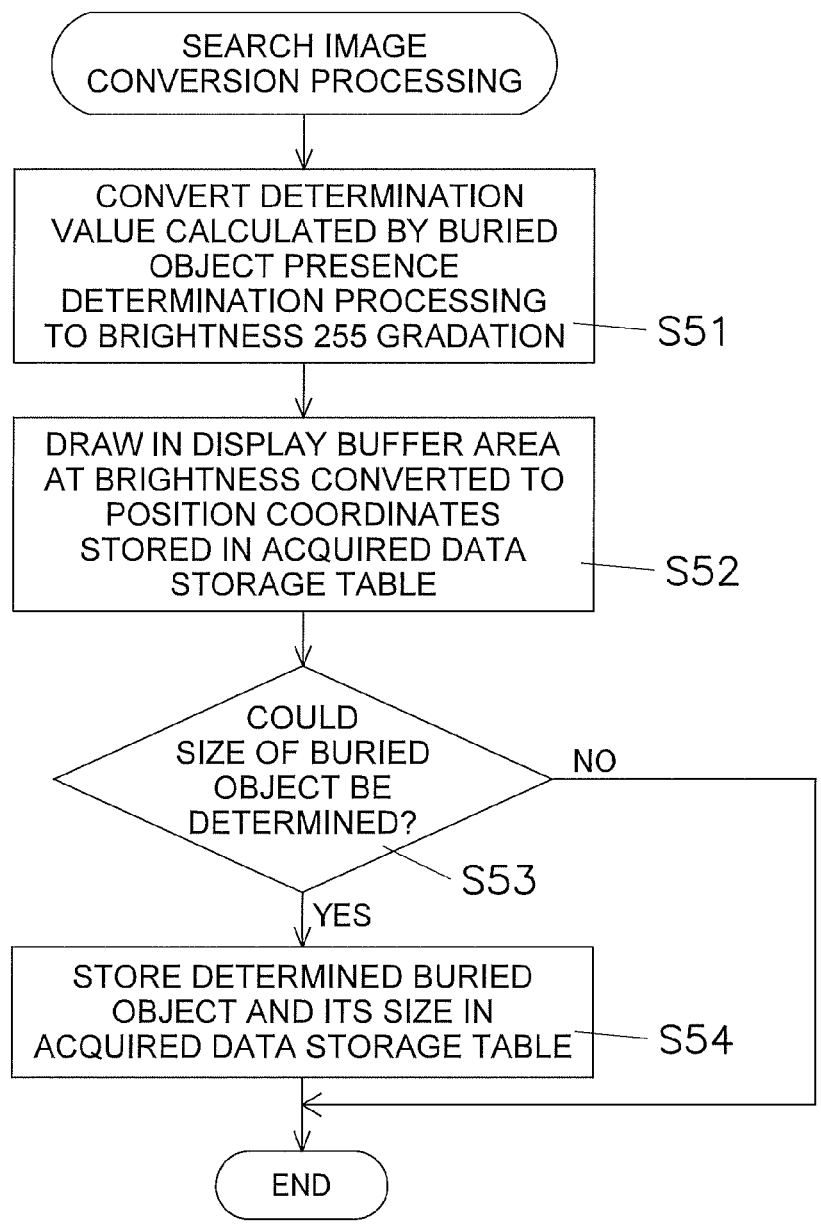
FIG. 9 is a flowchart showing the flow of the search image conversion processing in the buried object scanning device in FIG. 3.

The search image conversion processing in S19 of FIG. 5 carried out by the buried object scanning device 10 of this embodiment will now be described in detail with reference to the flowchart of FIG. 9.

Figure 7:
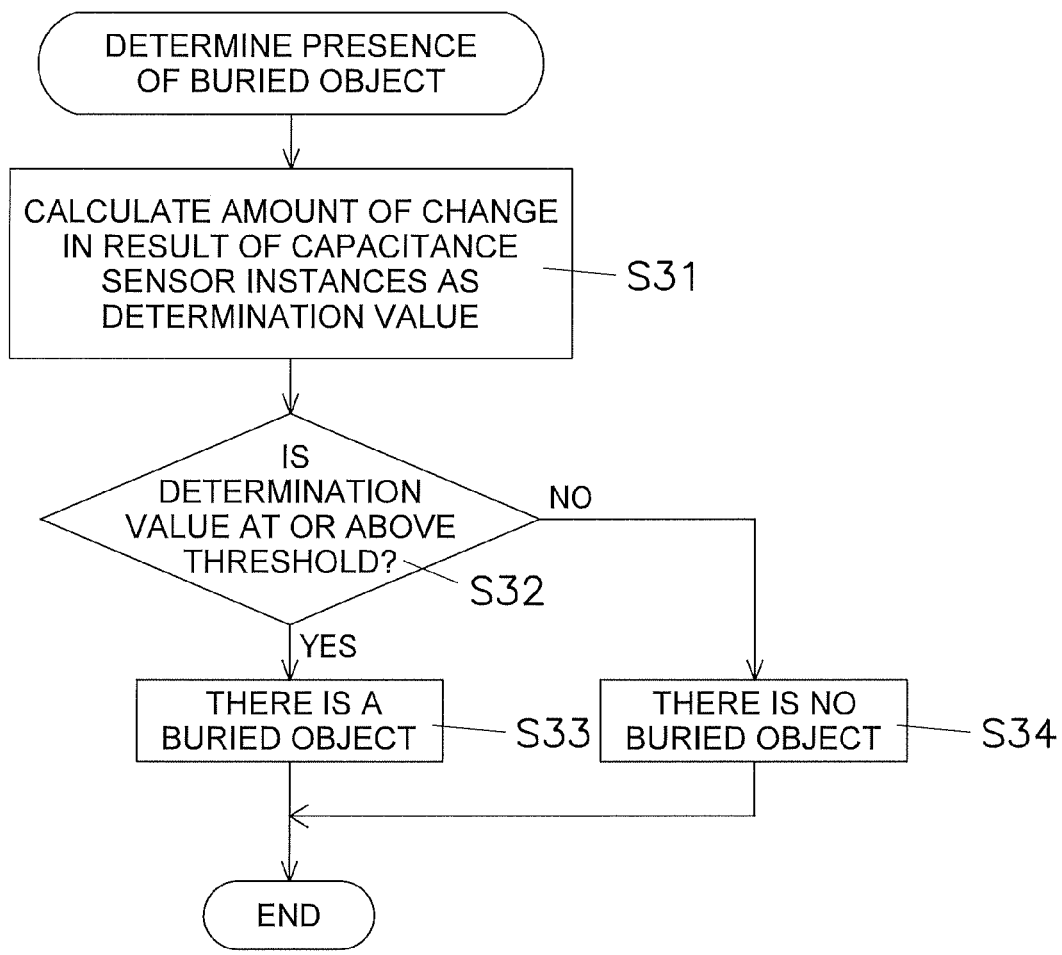
FIG. 7 is a flowchart showing the flow of processing to determine the presence or absence of a buried object with the buried object scanning device in FIG. 3.

First, in step S51, the amount of change (determination value) in the sensed result of the capacitance sensor calculated in S31 of the buried object presence determination processing shown in FIG. 7 is converted into a brightness 255 gradation.

Next, in step S52, a search image is generated by drawing in the display buffer area at the brightness converted to the position coordinates included in the acquired data storage table shown in FIG. 12.

As shown in FIG. 13, the coordinates (X, Y) and the corresponding R, G, and B values are stored in the display buffer area.

Next, in step S53, it is determined whether or not the size of the buried object 51 could be determined. Here, if the size could be determined, the processing proceeds to step S54, and if the size could not be determined, the processing ends.

Next, in step S54, the buried object 51 whose size has been determined and its size (in the scanning direction) are stored in the acquired data storage table shown in FIG. 12, and the processing is ended.

(e) Search Image Storage Processing

Figure 10:
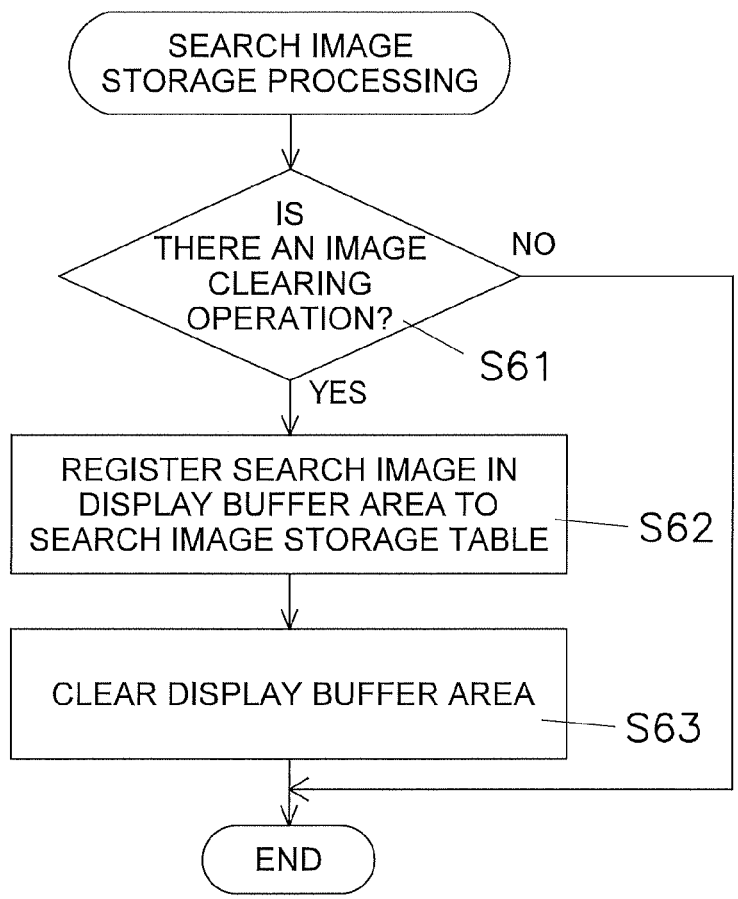
FIG. 10 is a flowchart showing the flow of search image storage in the buried object scanning device in FIG. 3.

The search image storage processing in S20 of FIG. 5 carried out by the buried object scanning device 10 of this embodiment will now be described in detail with reference to the flowchart of FIG. 10.

First, in step S61, it is determined whether or not an image clearing operation has been received, such as pressing of the search start button by the user.

Here, if an image clearing operation has been received, the processing proceeds to step S62, and otherwise the processing ends at that point.

Next, in step S62, the search image in the display buffer area shown in FIG. 13 is registered in the search image storage table shown in FIG. 14 before the screen is cleared.

Here, as shown in FIG. 14, the search image storage table is stored in a state in which the date and time when the search image was generated and the image data ID attached to each search image are associated with each other. The search images stored in the search image storage table are each stored as image data corresponding to one operation.

Next, in step S63, the display buffer area is cleared and the processing ends.

Display Control Method of Buried Object Scanning Device 10

The display control method of the buried object scanning device 10 in this embodiment will now be described with reference to FIGS. 15 to 24.

(a) Startup and Preparation

Figure 15:
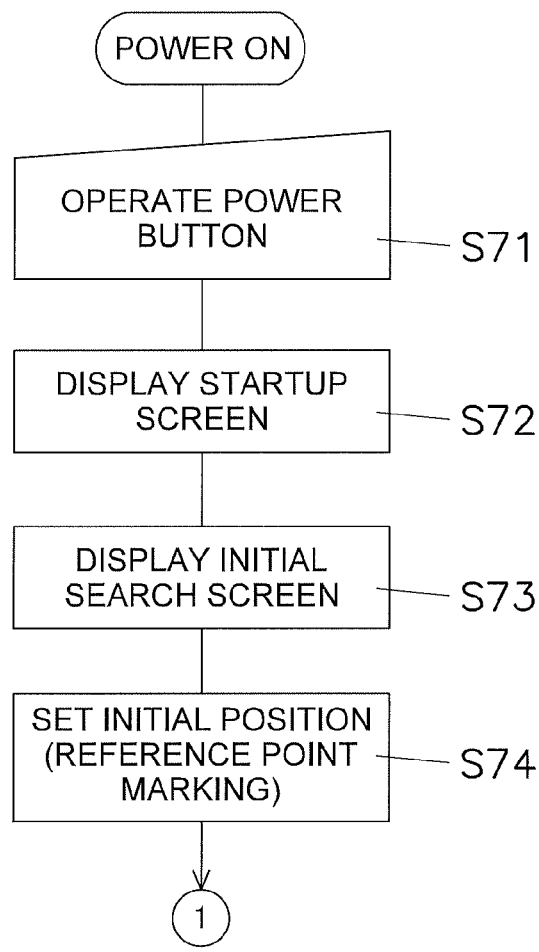
FIG. 15 is a flowchart showing the flow of processing in the display control method of the buried object scanning device in FIG. 3.

First, as shown in FIG. 15, if the user operates (holds down) the power button 15a in step S71, then in step S72 the display control unit 30 displays a startup screen on the display screen 12a of the buried object scanning device 10.

Next, in step S73, the display control unit 30 causes the display screen 12a of the buried object scanning device 10 to display the initial search screen following the startup screen.

Figure 16:
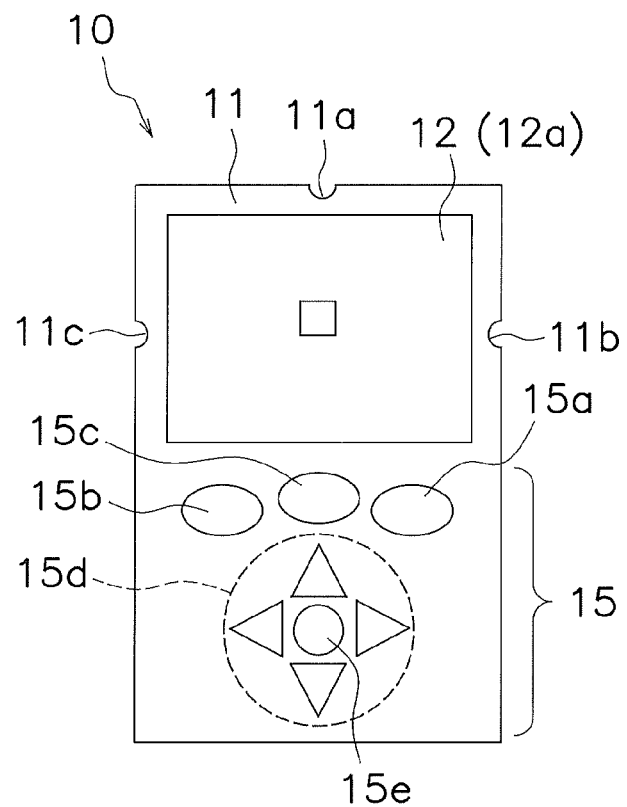
FIG. 16 is a diagram showing an example of the initial search screen displayed on the display screen of the buried object scanning device in FIG. 3.

The initial search screen is, for example, a screen on which a square is displayed in the center of the display screen 12a, as shown in FIG. 16.

Next, in step S74, in a state in which the rear side of the main body 11 of the activated buried object scanning device 10 is pressed against the construction surface (wall surface 50) to be searched, the user engages a pen or the like with the recess 11a and marks the wall surface 50 with a reference point P1 serving as the scanning start point, thereby setting the initial position at the start of scanning.

(b) Search Scanning

Figure 17:
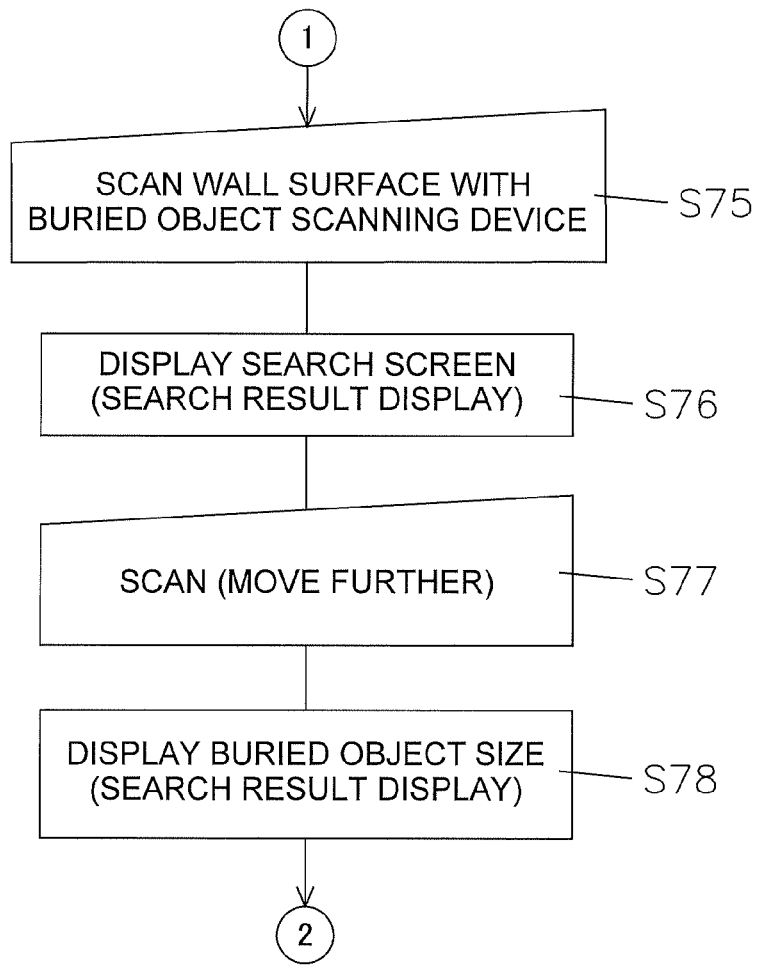
FIG. 17 is a flowchart showing the flow of processing from the start of scanning until the dimensions of the buried object are displayed, and continues from the flowchart in FIG. 3.

Next, as shown in FIG. 17, in step S75, the user moves the buried object scanning device 10 along the wall surface 50 to scan along the construction surface.

Next, in step S76, the display control unit 30 (search image display processing unit 32, origin display processing unit 33) displays a reference point display layer including a search image indicating the search result over the scanned range, and a reference point P1 on the display screen 12a of the buried object scanning device 10.

Figure 18A:
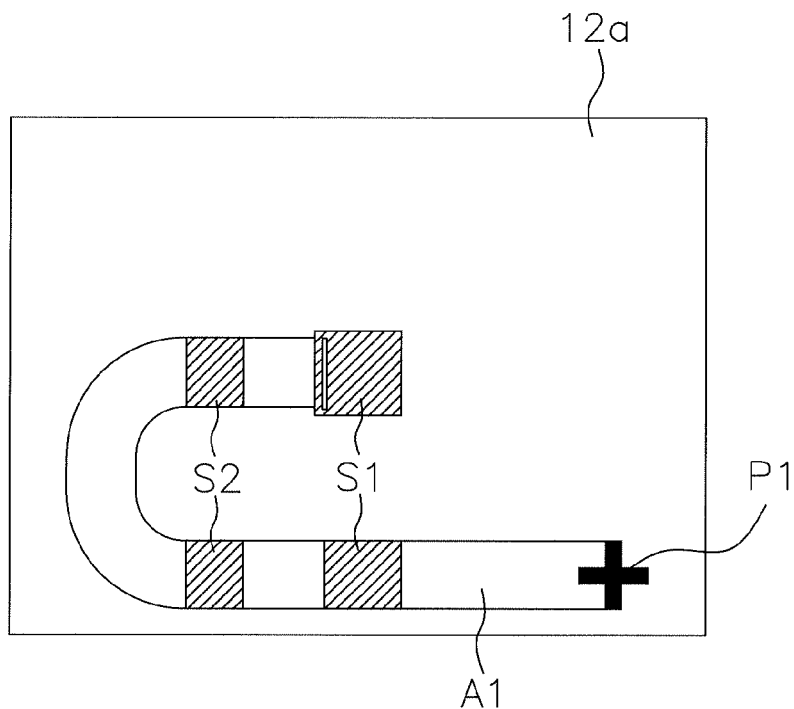
FIG. 18A is a diagram showing the search screen of the buried object scanning device displayed by the processing in the flowchart of FIG. 17.

As shown in FIG. 18A, this search screen displays an area A1 scanned by the buried object scanning device 10, detection areas S1 and S2 indicating the buried object 51 in the scanning area A1, and the reference point P1 at which the scanning was started.

Next, in step S77, the user further scans the wall surface 50 with the buried object scanning device 10.

Figure 18B:
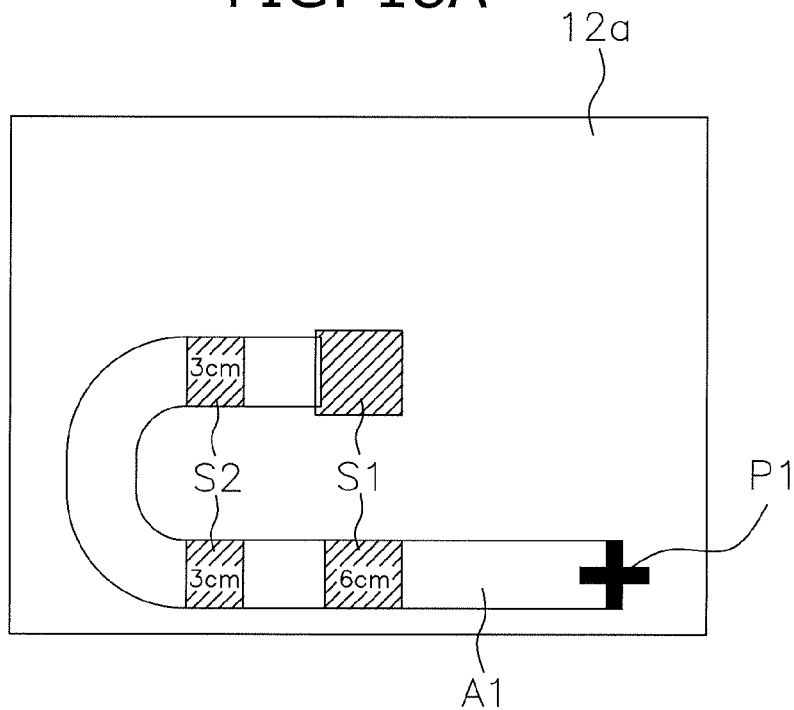
FIG. 18B is a diagram showing a screen on which are displayed the dimensions of the buried object detected on the search screen of FIG. 18A.

Next, in step S78, when search data is accumulated by further scanning in step S77, the display control unit 30 (search image display processing unit 32) causes the calculated size (width) (6 cm, 3 cm) of the detected buried object 51 in the scanning direction to be displayed on the search image as shown in FIG. 18B.

(c) Grid Display and Alignment Operation

Figure 19:
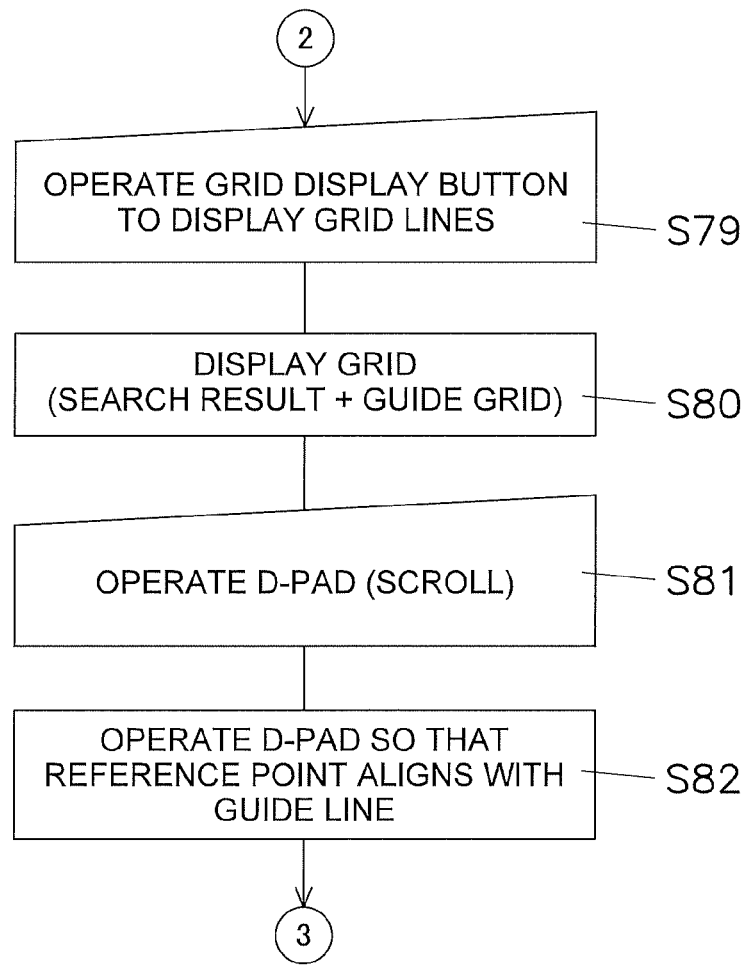
FIG. 19 is a flowchart showing the flow of processing from grid display to position adjustment of the reference point, and continues from the flowchart in FIG. 17.

Next, as shown in FIG. 19, in step S79, after one scan is complete, the user moves the buried object scanning device 10 away from the wall surface 50 and presses the grid display button 15b. If the grid display button 15b has already been pressed, scanning may be performed with the grid layer displayed.

Figure 20A:
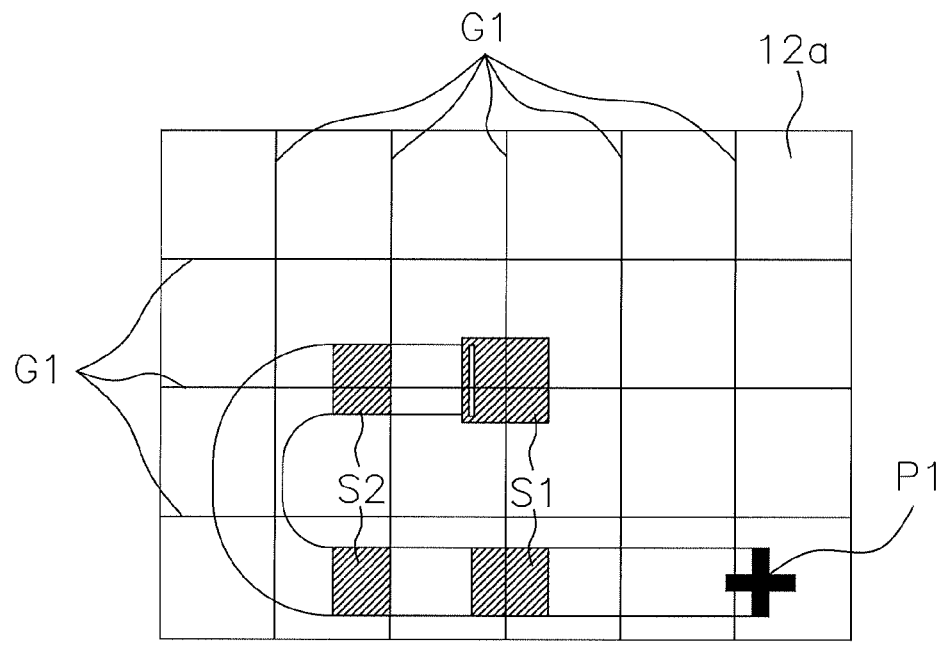
FIG. 20A is a diagram showing a search image and a grid display superimposed on the display screen of the buried object scanning device.

Next, in step S80, as shown in FIG. 20A, the display control unit 30 (grid display processing unit 31) displays a grid layer including a plurality of grid lines G1 arranged in a grid pattern on the display screen 12a of the display unit 12, superimposed on the search image.

Next, in step S81, when the user operates the D-pad 15d in the up, down, left, or right direction on the display screen 12a shown in FIG. 20A, the search image and the reference point display layer including the reference point P1 move relative to the grid layer including the grid lines G1 (fixed display).

Figure 20B:
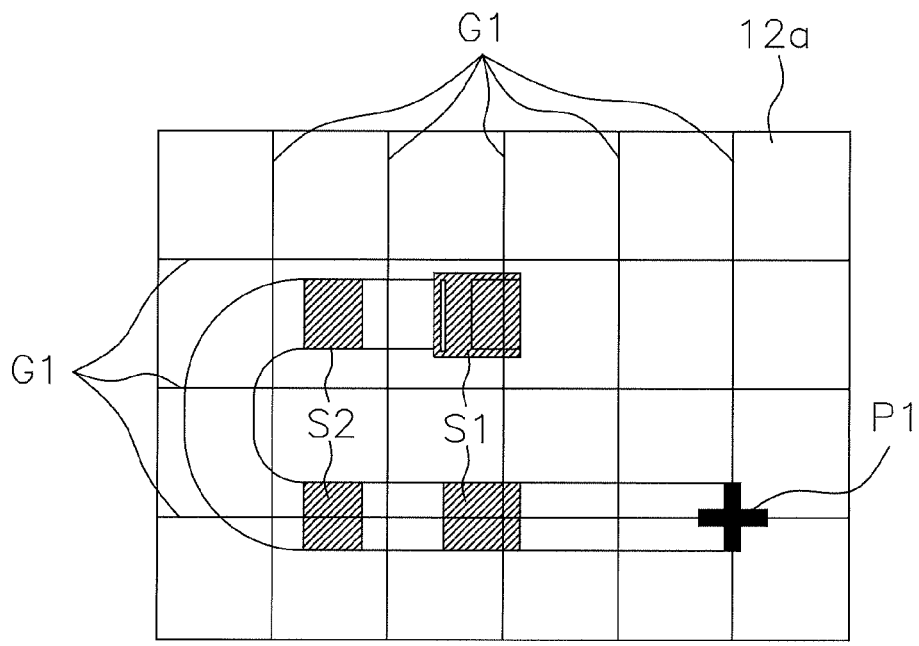
FIG. 20B is a diagram showing the state after adjusting the position of the reference point included FIG. 20A.

Next, in step S82, when the user operates the D-pad so that the position of the reference point P1 coincides with a specific position of the guide lines, the position of the reference point P1 can be aligned with a specific position of the grid lines included in the grid layer, as shown in FIG. 20B.

Consequently, the position (distance) of the buried object 51 from the reference point P1, the shape of the buried object 51, and so forth can be recognized on the display screen 12a.

(d) Distance and Size of Buried Object by Measurement Grid

Figure 21:
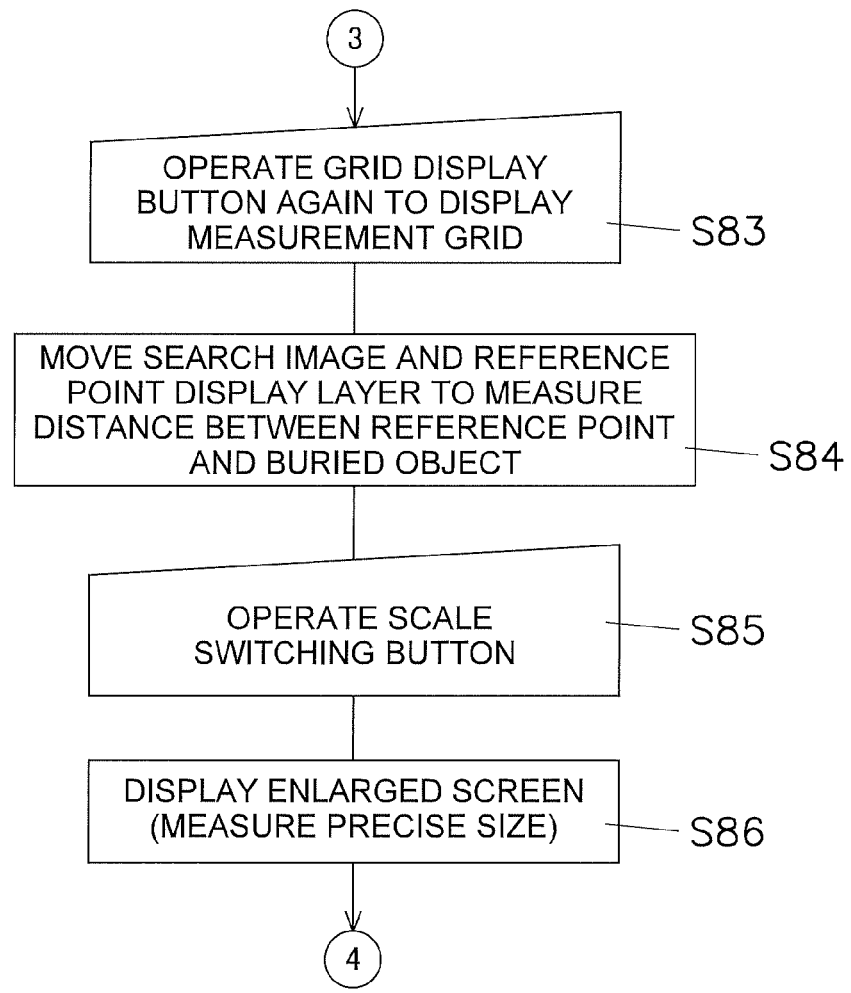
FIG. 21 is a flowchart showing the flow of processing from the measurement grid display to the display of an enlarged screen of the reference point, and continues from the flowchart in FIG. 19.
Figure 22A:
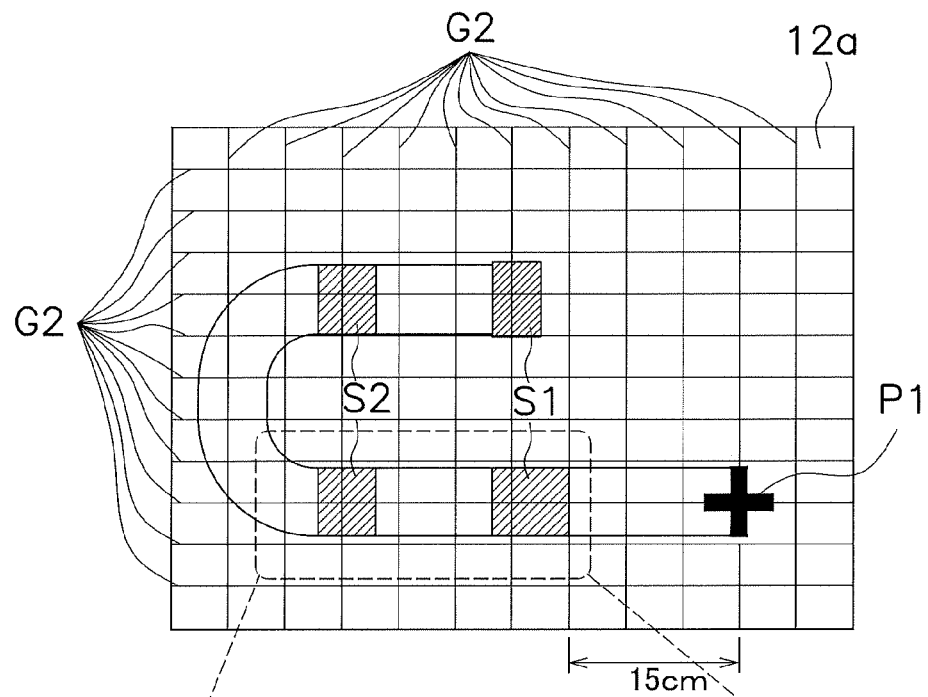
FIG. 22A is a diagram showing a search image and a measurement grid superimposed on a display screen of a buried object scanning device.

Next, as shown in FIG. 21, in step S83, when the user again presses the grid display button 15b, the display control unit 30 (grid display processing unit 31) causes the display screen 12a to display the measurement grid (grid lines) G2 shown in FIG. 22A.

As shown in FIG. 22A, the displayed measurement grid G2 has a narrower spacing than the grid lines shown in FIG. 20A, etc., so that the user can look at the display screen 12a and visually measure the size and distance from the reference point P1 of the buried object 51.

Next, in step S84, when the user operates the D-pad 15d, the display control unit 30 (search image display processing unit 32) moves the search image and the reference point display layer relative to the measurement grid G2 in order to accurately measure the distance between the reference point P1 and the buried object 51 in a state in which a grid layer including the measurement grid G2 is displayed superimposed on the search image.

Consequently, if we let the spacing of the measurement grid G2 shown in FIG. 22A be 5 cm, for example, the user can recognize that the distance from the reference point P1 to the detection area S1 is about 15 cm while looking at the display screen 12a.

Figure 22B:
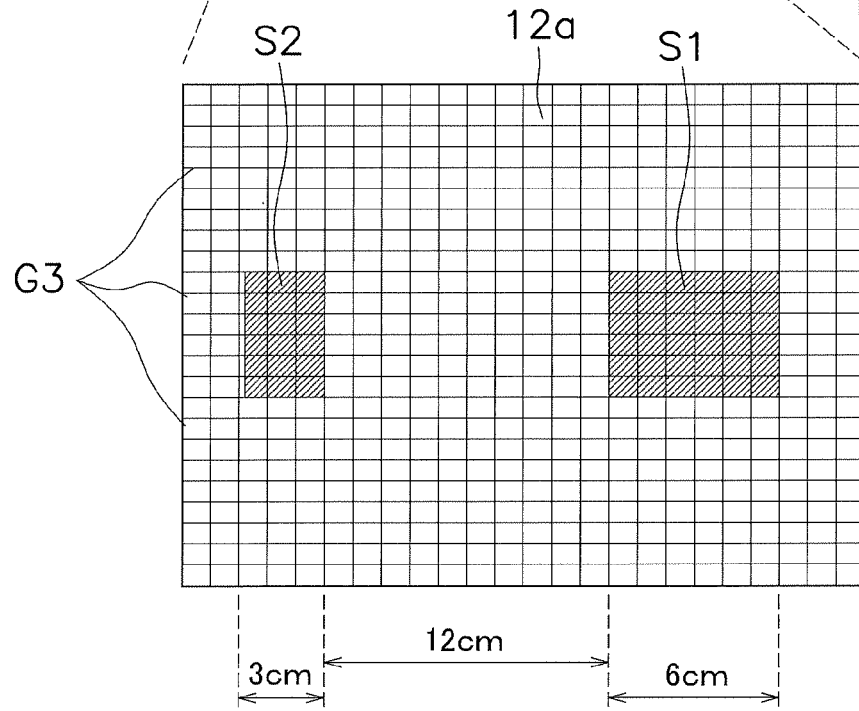
FIG. 22B is a diagram showing a magnified image of FIG. 22A and a measurement grid corresponding to the magnified image.

Next, in step S85, when the user presses the scale switching button 15c, in step S86, the display control unit 30 (search image display processing unit 32) displays the area indicated by the dotted line in FIG. 22A in an enlarged view as shown in FIG. 22B.

For example, if we let the spacing of the measurement grid (grid lines) G3 shown in FIG. 22B be 1 cm, the user can look at the display screen 12a while measuring the size more precisely, finding the width of the buried object 51 in the detection area S1 to be about 6 cm, the width of the buried object 51 in the detection area S2 to be about 3 cm, and the spacing between the buried objects 51 in the detection areas S1 and S2 to be about 12 cm.

(e) From Construction Work to Switching Off Power

Figure 23:
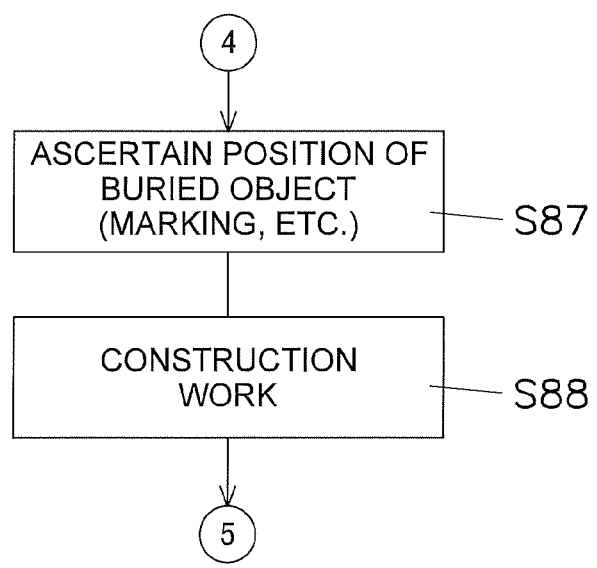
FIG. 23 is a flowchart showing the position of a buried object and the flow of construction work, and continues from the flowchart of FIG. 21.

Next, as shown in FIG. 23, on the basis of the distance from the reference point P1 to the buried object 51 measured on the display screen 12a by the processing up to step S86, first, in step S87, the user marks a position 15 cm in the horizontal direction from the position on the wall surface 50 marked as the reference point P1, as the position of the end portion of the buried object 51, in order to ascertain the actual position of the buried object 51.

At this point, marking can also be performed only at the construction position and the position where a buried object exists.

Next, in step S88, the user performs various construction operations in a state of being aware of the position of the buried object 51 marked on the wall surface 50.

Figure 24:
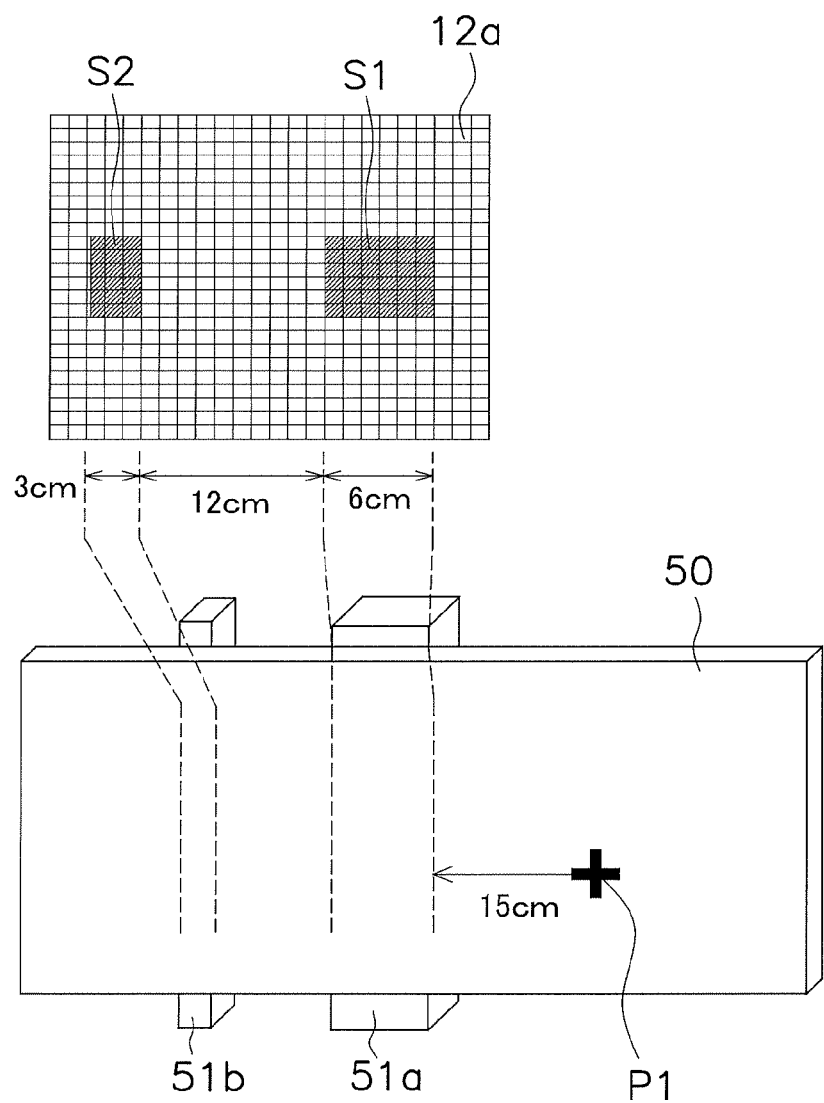
FIG. 24 is a diagram showing construction work for confirming the position of a buried object in an actual wall surface corresponding to the enlarged display in FIG. 22B.

That is, the user performs work on the wall surface 50 (marking if necessary) by using the distance between the reference point P1 and the buried object 51, the size of the buried object 51, and the like displayed on the display screen 12a as shown in FIG. 24, while checking the reference point P1 displayed on the display screen 12a of the buried object scanning device 10, and the position of the buried object 51 in the detection areas S1 and S2.

After this, the user presses the power button 15a to turn off the power, and the work is finished.

(3) Configuration of Dimensional Information Management Device 40

The dimensional information management device 40 is, for example, a smartphone or tablet terminal owned by a worker, a personal computer (PC) used by a manager, or the like, and as shown in FIG. 25, comprises a data receiving unit (acquisition unit) 41, a search information registration unit 42, a memory unit (search information storage unit) 43, an input unit 44, a construction information registration unit 45, a search information call-up unit 46, a collation unit 47, a construction drawing creation unit 48, a display control unit (first display control unit) 49, and a display unit (first display unit) 49a.

Figure 26:
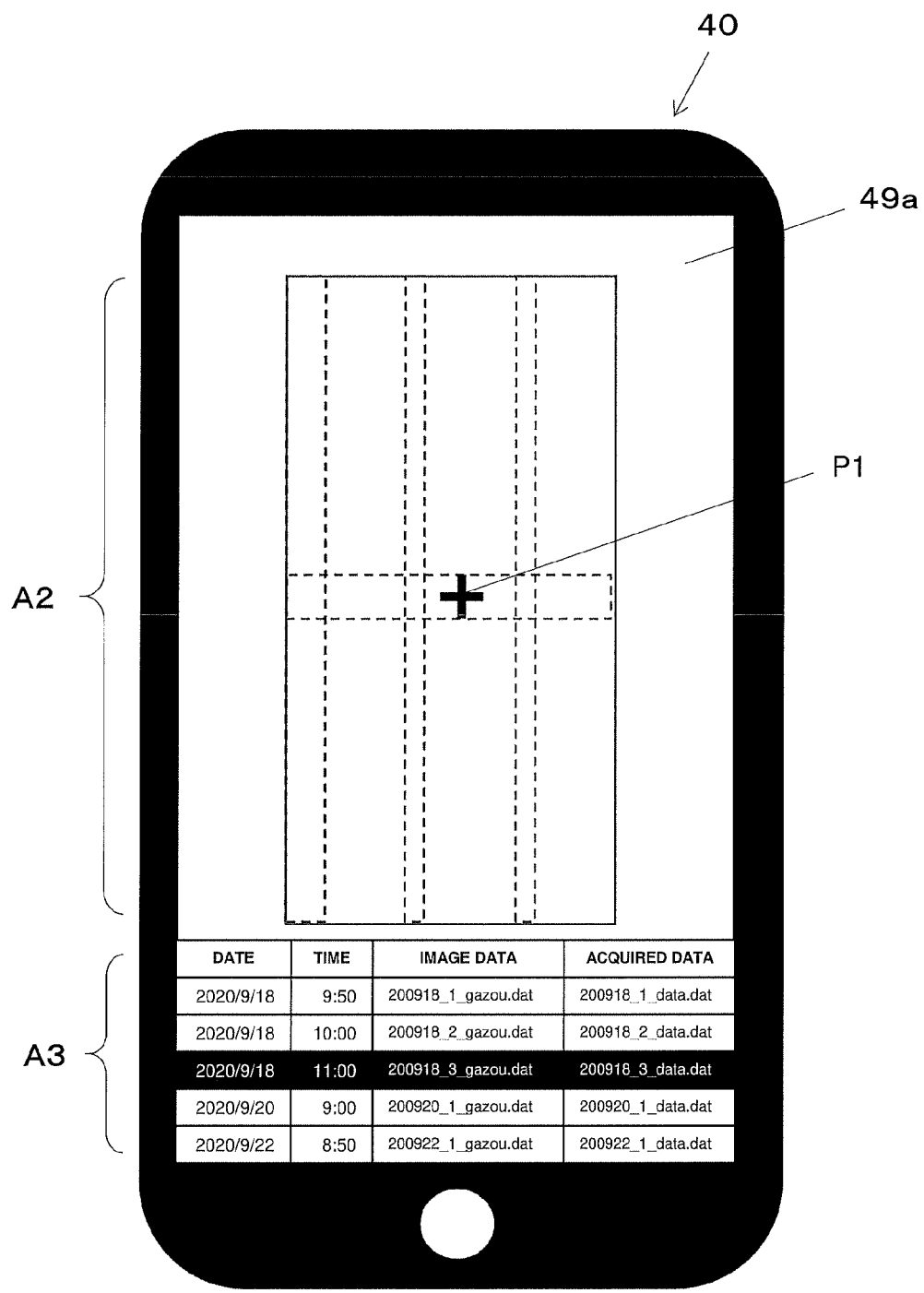
FIG. 26 is a diagram showing an example of the display screen of the dimensional information management device in FIG. 25.

As shown in FIG. 26, the dimensional information management device 40 displays an image display area A2, in which is displayed a search image selected from among the search information acquired from the buried object scanning device 10, and a data selection area A3 showing a list of search information registered in the memory unit 43, on the display screen of the display unit 49a of the smartphone or the like.

The data receiving unit (acquisition unit) 41 communicates with the data transfer unit 29 (see FIG. 3) of the buried object scanning device 10 and acquires search information including the search images generated by the buried object scanning device 10.

The search information registration unit 42 registers (saves) the search information received from the buried object scanning device 10 by the data receiving unit 41 in the search information registration database of the memory unit 43.

As shown in FIG. 25, the memory unit (search information memory unit) 43 has a search information registration database in which the search information acquired from the buried object scanning device 10 is registered, and a construction information registration database in which construction information inputted by a worker or the like is registered.

The input unit 44 is, for example, a touch panel or the like of the dimensional information management device 40 of the smartphone, etc., shown in FIG. 26, and construction information is inputted to this input unit by a worker or the like.

The construction information registration unit 45 registers (saves) the construction information inputted to the input unit 44 in the construction information registration database of the memory unit 43.

Figures 27A, 27B, 27C:
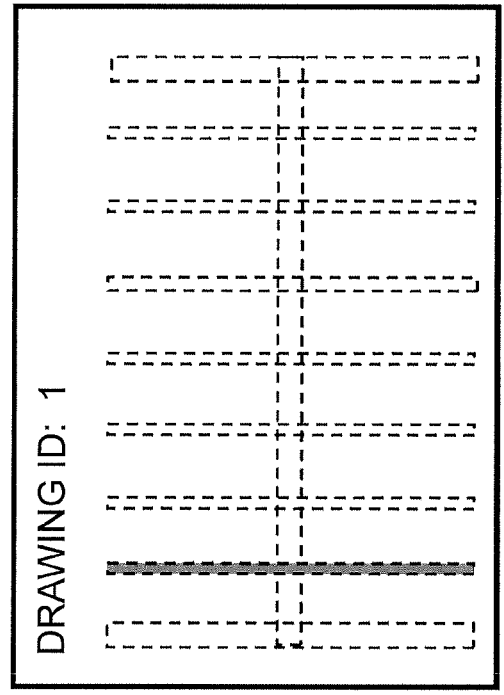
FIG. 27A is a diagram showing an input example of construction information inputted to the dimensional information management device in FIG. 25.
FIG. 27B is a diagram showing an example of a structure inputted to the dimensional information management device in FIG. 25.
FIG. 27C is a diagram showing an example of construction information registered in the dimensional information management device in FIG. 25.

Here, as shown in FIG. 27A, the construction information inputted from the input unit 44 includes the name and width of the buried object (pillar A), the strength (high, medium, low) of screws or the like used on the buried object (pillar A), the number (1, 1, 2), pitch (-, -, 15), and size (M10, M8, M4) of the screws, etc., the positions of the screws, and other such information.

As shown in FIG. 27B, the position of the buried object (pillar A) to undergo construction, which is inputted to the input unit 44, is displayed as drawing ID: 1.

Then, as shown in FIG. 27C, the construction information registered in the construction information registration database of the memory unit 43 by the construction information registration unit 45 is stored by organizing the width of the buried object (pillars A, B, C, . . . ), and the strength, number, pitch, size, etc., of the screws or other such construction materials for each of these buried objects. Consequently, a worker or the like can check the list of registered construction information while looking at the display screen displayed on the display unit 49a of the dimensional information management device 40, for example.

Figure 28:
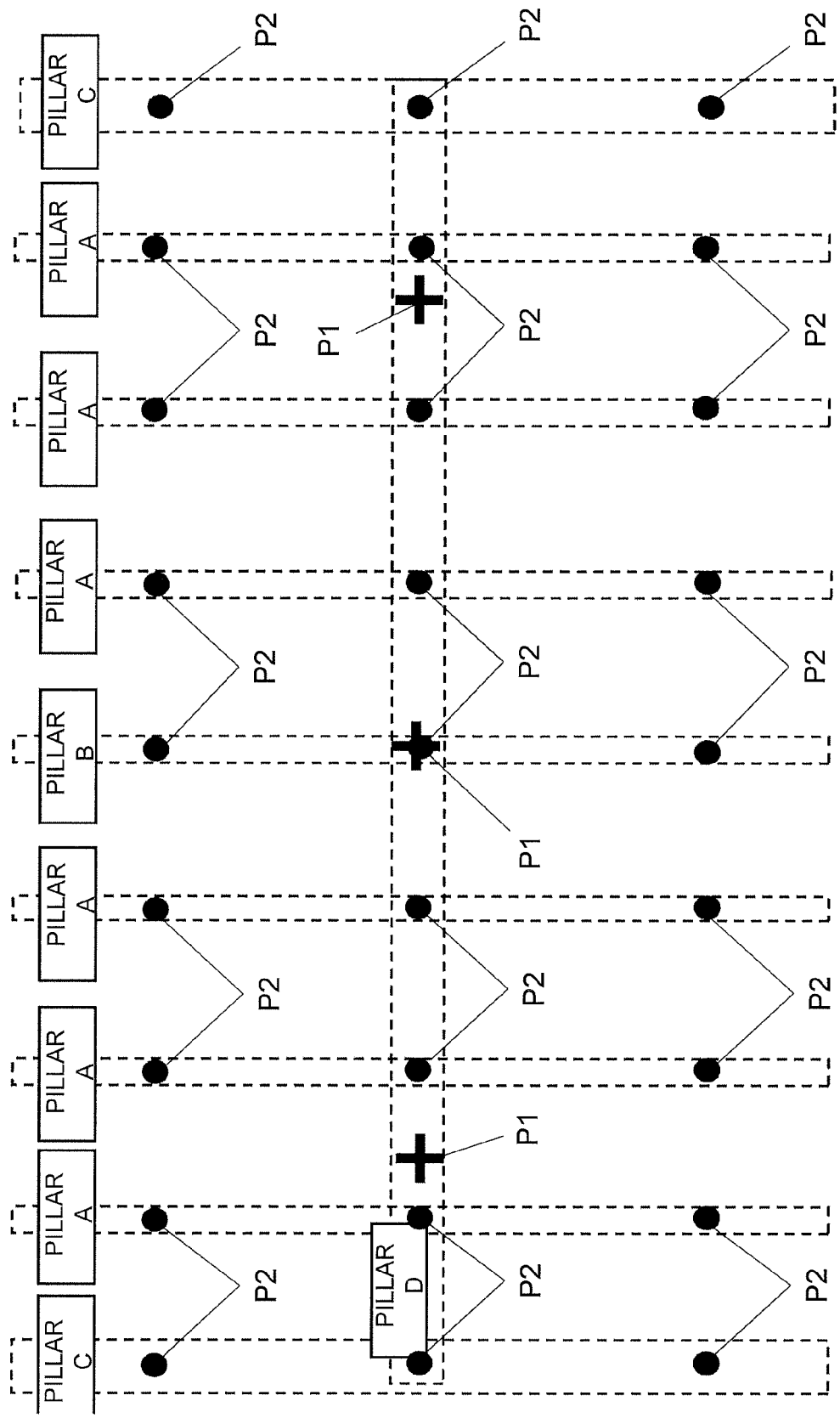
FIG. 28 is a diagram showing a simulation of the construction information registered in the dimensional information management device in FIG. 25.

Then, as shown in FIG. 28, the reference point P1 at which the scanning of the buried object scanning device 10 is started and the screwing positions P2 are appended to a drawing showing the various buried object (pillars A, B, C, . . . ) on the basis of the construction information registered in the list of FIG. 27C, and the resulting drawing is saved.

The reference point P1 is used as a reference point when collating with the search image included in the search information acquired from the buried object scanning device 10.

Also, the construction information shown in FIG. 28 shows a drawing created for performing screw fastening work from the wall surface 50 at the positions of the buried objects 51 (pillars A, B, C, D) that are in the wall surface 50.

The search information call-up unit 46 calls up the search information registered to the search information registration database of the memory unit 43 and transmits this information to the display control unit 49.

The collation unit 47 collates the search information received from the search information registration database of the memory unit 43 with the construction information received from the corresponding construction information registration database. The collation unit 47 then compares the search information and the construction information at the positions corresponding to each other, and determines whether or not they match, that is, whether or not the positions of the buried objects 51 in the search image detected by the buried object scanning device 10 match the positions of the buried objects 51 in the drawing.

Figure 29:
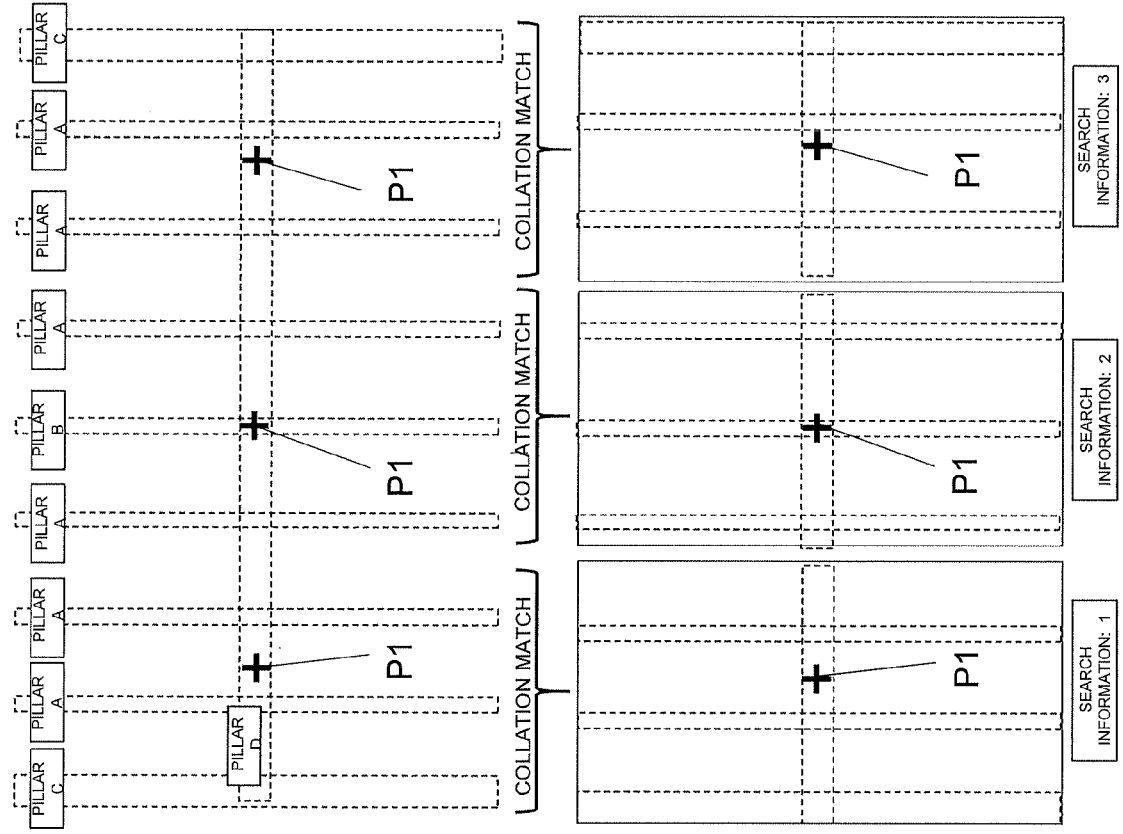
FIG. 29 is a diagram showing a simulation of the collation of construction information (drawing ID) and a search image collated by the dimensional information management device in FIG. 25.

More specifically, as shown in FIG. 29, a drawing showing the positions of the buried objects (pillars A, B, C, and D) obtained from the construction information of the upper drawing ID: 1, is collated with the positions of the buried objects in the search image acquired as the lower search information.

Here, the collation between the upper drawing and the lower search image is performed using the above-mentioned reference point P1 as a reference.

At this time, verification of whether or not the two match may be performed using dimensional information such as the distance from the reference point P1 to each buried object, the spacing between buried objects 51, or the width of a buried object, or it may be performed by pattern matching between the drawing and the search image, using the reference point P1 as a reference.

If the collation unit 47 determines that the two match, the construction drawing creation unit 48 creates a construction drawing that reflects construction information such as the screwing position P2 in the search image showing the position of the buried object 51.

Figure 30:
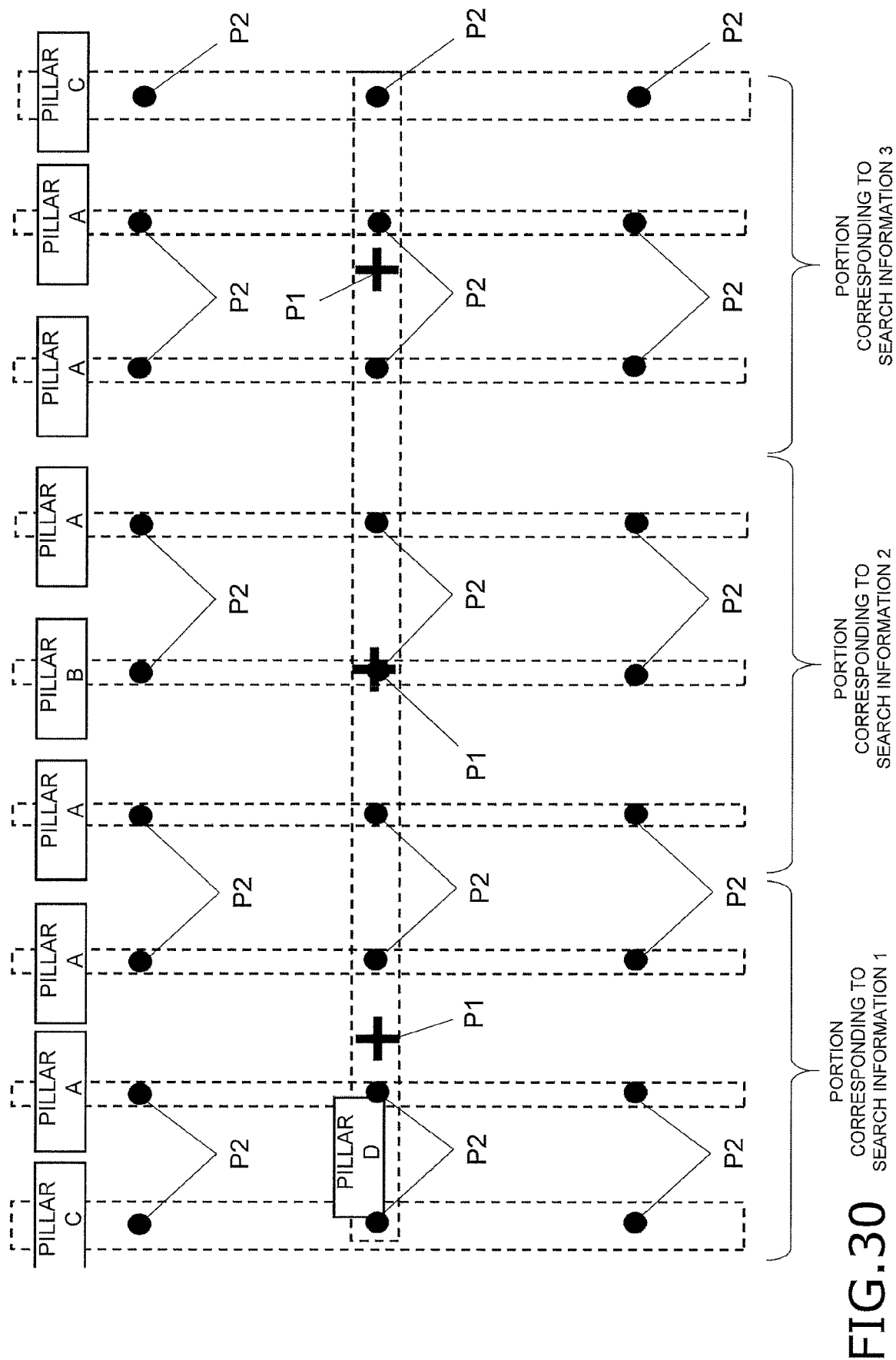
FIG. 30 is a diagram showing the processing to create a construction drawing by reflecting the construction information of a drawing ID in each set of search information when the search image matches the registered drawing ID.

In the collation shown in FIG. 29, as shown in FIG. 30, the collation may be performed by combining a plurality of portions corresponding to various sets of search information 1, 2, and 3 to create a single drawing of construction information.

Figure 31C:
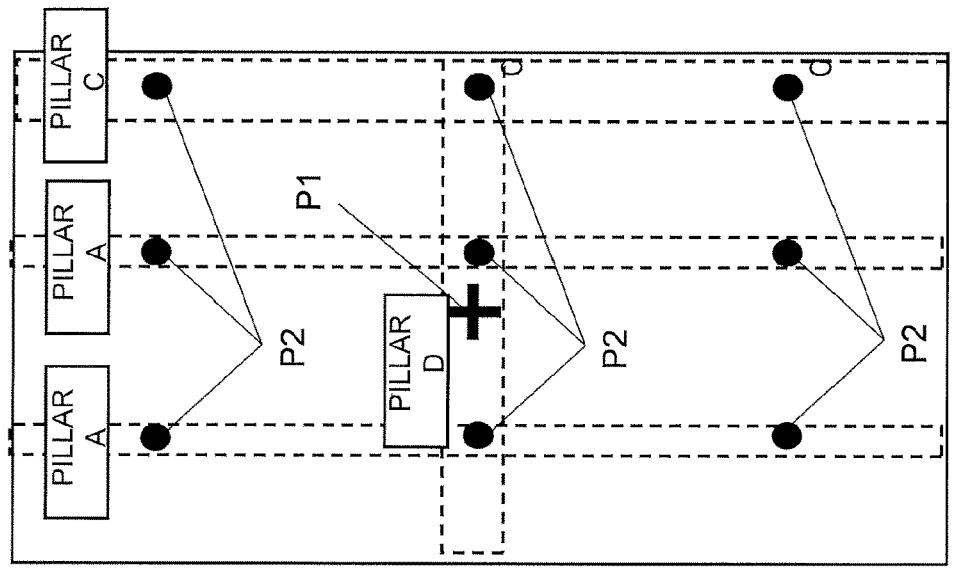
FIG. 31A to 31C are diagrams showing display examples after a construction information has been reflected in the construction drawing of FIG. 31.
Figure 31B:
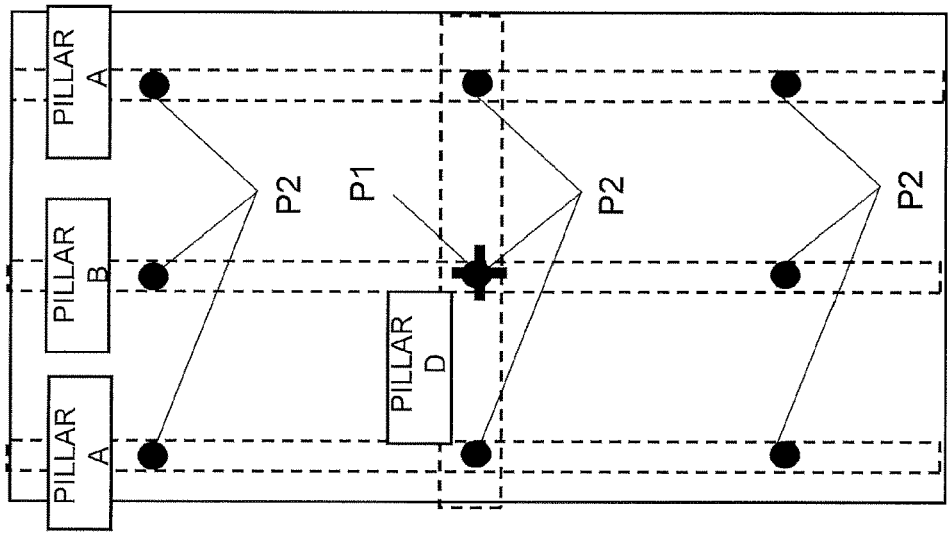
Figure 31A:
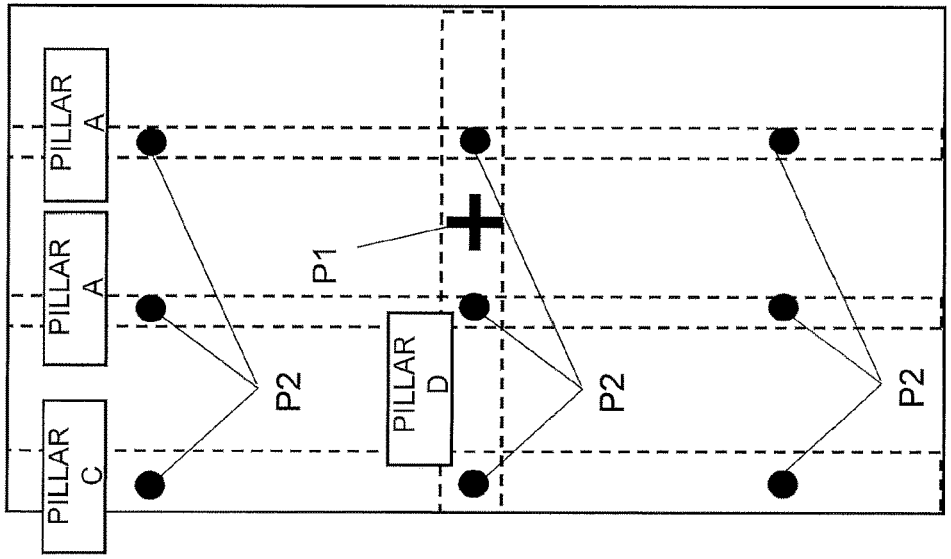

Then, as shown in FIGS. 31A to 31C, the construction drawing creation unit 48 creates a construction drawing in which the screwing position P2 included in the construction information drawing is reflected in the search images for the sets of search information 1 to 3.

The display control unit (first display control unit) 49 performs control so that search information, construction drawings, and the like are displayed on the display screen of the display unit 49a shown in FIG. 26.

The display unit (first display unit) 49a displays search information, construction drawings, and the like as a display device, and is also used as the touch panel-type input unit 44 mentioned above.

Search Information Analysis Processing

Figure 32:
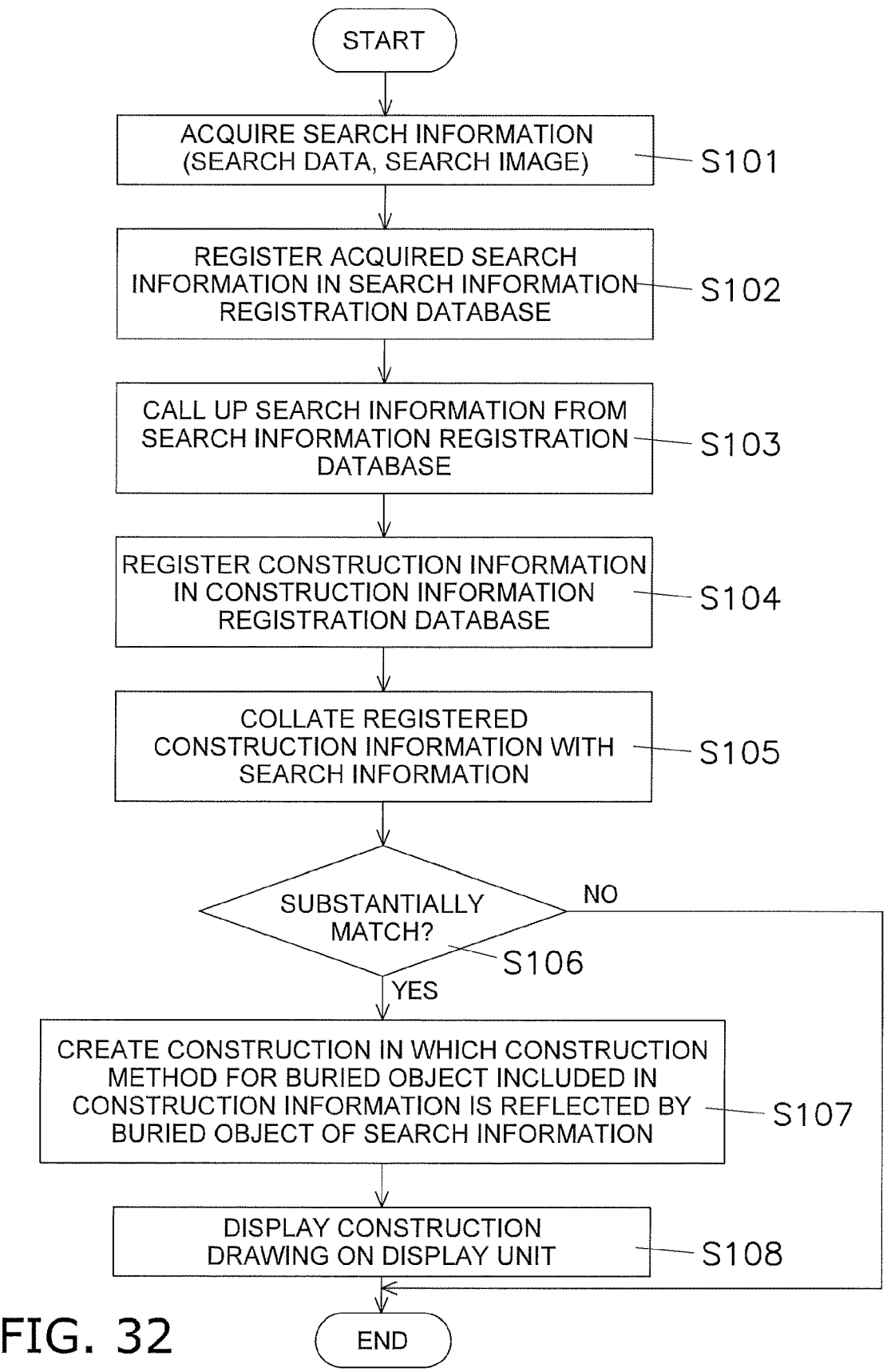
FIG. 32 is a flowchart showing the flow of the search information analysis processing in the dimensional information management device in FIG. 25.

With the dimensional information management device 40 in this embodiment, because of the above configuration, search information is analyzed according to the flowchart shown in FIG. 32 by using the search information acquired from the buried object scanning device 10.

That is, in step S101, the data receiving unit 41 of the dimensional information management device 40 acquires the search information including the search data and the search image from the data transfer unit 29 of the buried object scanning device 10.

Next, in step S102, the search information registration unit 42 registers (saves) the search information received by the data receiving unit 41 in step S101 in the search information registration database of the memory unit 43.

Next, in step S103, the search information call-up unit 46 calls up the search information registered in the memory unit 43 from the search information registration database.

Next, in step S104, the construction information registration unit 45 registers (saves) the construction information inputted from the input unit 44 in the construction information registration database of the memory unit 43.

Next, in step S105, the collation unit 47 collates the construction information (drawings, etc.) registered in the construction information registration database of the memory unit 43 in step S104, with the search information (search images, etc.) registered in the search information storage database.

Next, in step S106, if the collation by the collation unit 47 determines that the two substantially match, the processing proceeds to step S107. On the other hand, if the collation by the collation unit 47 determines that the two do not match, it is determined that the position of the buried object 51 obtained from the search information is offset from the actual position, and the processing is ended.

Here, the collation done by the collation unit 47 in step S106 is carried out, as described above, by comparing the dimensional information such as the position, spacing, or the like of the buried object 51 using the reference point P1 as a reference, or by comparing a drawing and a search image by pattern matching, as discussed above.

Next, in step S107, since the collation by the collation unit 47 determined in step S106 that the two substantially matched, the construction drawing creation unit 48 creates a construction drawing in which the construction method (construction position, etc.) for the buried object 51 included in the construction information is reflected by the buried object 51 of the search information (search image).

Here, the above-mentioned construction method includes the construction to be performed, such as screwing to the buried object 51, the size of the screws used, and other such information.

Next, in step S108, the display control unit 49 controls the display unit 49a so as to display the construction drawing created by the construction drawing creation unit 48.

Registration Processing of Construction Information

Figure 33:
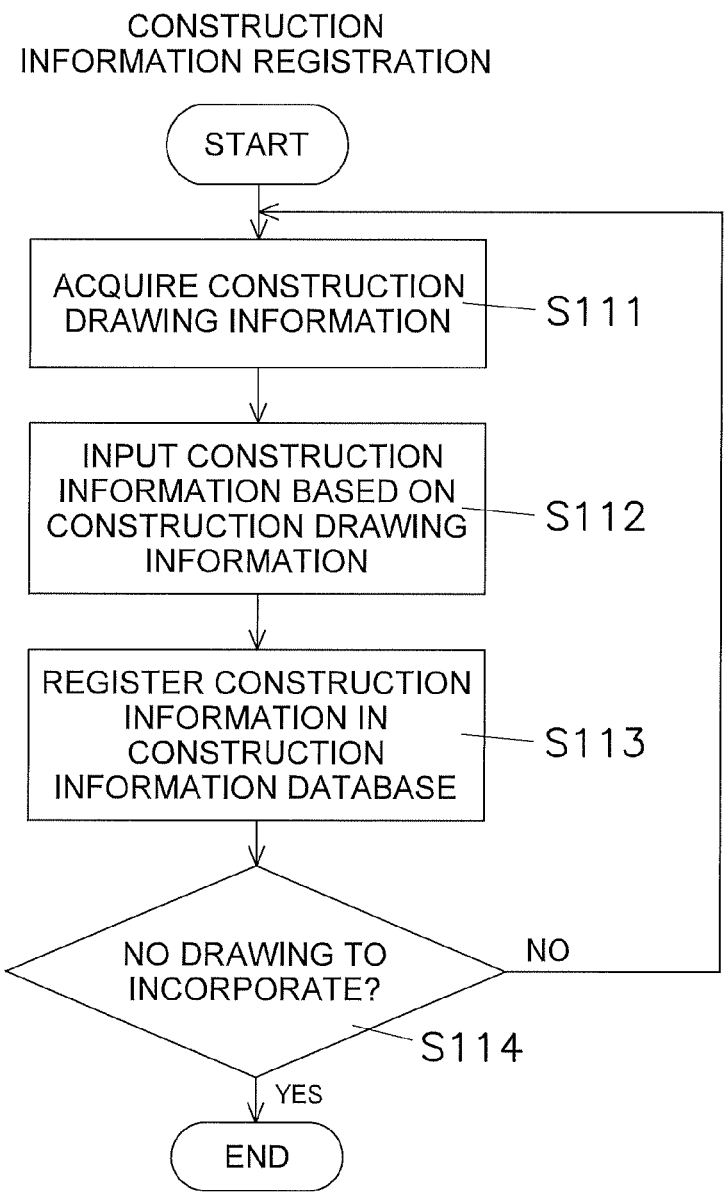
FIG. 33 is a flowchart showing the flow of processing to register construction information in the dimensional information management device in FIG. 25.

Next, the flow of processing when the construction information inputted by a worker or the like via the input unit 44 is registered in the construction information registration database of the memory unit 43 in the dimensional information management device 40 of this embodiment will be described with reference to the flowchart shown in FIG. 33.

In step S111, the dimensional information management device 40 acquires the construction drawing information via the input unit 44.

Next, in step S112, construction information for a pillar or other such buried object (the construction target) is inputted via the input unit 44 on the basis of the construction drawing information acquired in step S111.

Next, in step S113, the construction information registration unit 45 registers the construction information including the construction drawing in the construction information management database of the memory unit 43.

Next, in step S114, it is determined whether or not there is another drawing to be incorporated, and if there is none, the processing is ended. On the other hand, if there is another drawing to be incorporated, the processing of steps S111 to S114 is repeated until there are no more drawings to be incorporated.

OTHER EMBODIMENTS

An embodiment of the present invention was described above, but the present invention is not limited to or by the above embodiment, and various modifications are possible without departing from the gist of the invention.

(A)

In the above embodiment, an example was given in which the present invention was realized as the dimensional information management device 40, as the dimensional information management system 1 comprising said device, and as a dimensional information management method, but the present invention is not limited to this.

For instance, the present invention may be realized as a dimensional information management program for causing a computer to execute the dimensional information management method of the dimensional information management device 40 described above.

This dimensional information management program is stored in a memory (memory unit) installed in the dimensional information management device, and the CPU reads the dimensional information management program stored in the memory and causes the hardware to execute the various steps. More specifically, the same effect as described above can be obtained by having the CPU read the dimensional information management program and execute an acquisition step of acquiring search information including search images from the buried object scanning device, and a search information storage step of storing the search information acquired in the acquisition step.

Also, the present invention may be realized as a recording medium on which is stored the dimensional information management program used by the dimensional information management device.

(B)

In the above embodiment, an example was given in which the dimensional information management device 40 of the present invention was provided as a device separate from the buried object scanning device 10, such as a smartphone, a tablet terminal, a PC used by a manager, etc., that could communicate with the buried object scanning device 10, but the present invention is not limited to this.

For instance, the present invention may be realized as a buried object scanning device having the function of a dimensional information management device.

That is, the buried object search system of the present invention may be configured to be provided inside a buried object scanning device.

(C)

In the above embodiment, an example was given in which the present invention was applied to a capacitance-type buried object scanning device 10 in which the capacitance sensor 13 was used as a sensing unit, but the present invention is not limited to this.

For instance, the present invention may be applied to an electromagnetic wave-type buried object scanning device that receives a reflected electromagnetic wave emitted toward concrete or a wall material, and senses the position of the buried object.

(D)

In the above embodiment, an example was given in which the optical sensor 14 was used as the scanning unit for sensing the amount of movement of the buried object scanning device 10 on the wall surface, but the present invention is not limited to this.

For instance, the amount of movement of the buried object scanning device on the wall surface may be sensed by using a scanning unit that employs something other than an optical method.

(E)

In the above embodiment, an example was given in which the grid layer including the grid lines was in a fixed display, and the search image was moved, so that the search image was displayed in a state of being movable relative to the grid layer. However, the present invention is not limited to this.

For instance, the search image may be in a fixed display, and the grid layer may be displayed in a movable state.

Alternatively, both the search image and the grid layer may be displayed in a movable state as needed.

(F)

In the above embodiment, an example was given in which the buried object scanning device 10 was used to detect a wooden material (pillar, ground sill, beam, brace, etc.) contained in a wall surface such as drywall or plywood, but the present invention is not limited to this.

For instance, the buried object that is detected using the buried object scanning device may be some material other than a wooden material, such as a metal material or a resin material.

Similarly, the target may also be some material other than drywall, plywood, or other such wall surface, such as concrete.

That is, the buried object scanning device of the present invention may be used, for example, for detecting other materials, or foreign substances located in the ground.

(G)

In the above embodiment, an example was given in which the D-pad 15*d* was used to move the search image or the reference point display layer relative to the fixedly displayed grid layer on the display screen 12*a* of the display unit 12 of the buried object scanning device 10, but the present invention is not limited to this.

For instance, the buried object scanning device may be actually moved over the wall surface, so that the search image is moved on the basis of the information about the movement amount sensed by an encoder, a tracking sensor, or the like.

Alternatively, a cursor may be operated on a table to move the search image 1 mm the first time, 2 mm the second time, and so forth, according to the time change at the button, for example.

(H)

In the above embodiment, an example was given in which three types of grid layer, namely, the standard grid line G1, the measurement grid G3, and the measurement grid G3 for enlarged display, were used, but the present invention is not limited to this.

For instance, it is preferable to use a grid layer in which appropriately spaced grid lines are arranged according to the size (the size in the scanning direction) of the buried object to be detected.

(I)

In the above embodiment, an example was given in which the dimensional information management device 40 collated the search information, including a search image acquired from the buried object scanning device 10, with the construction information to create a construction drawing, but the present invention is not limited to this.

For instance, the dimensional information management device may have a main feature of using the search information including the search image acquired from the buried object scanning device to display the search information on the display unit.

Alternatively, the dimensional information management device may generate construction information by using search information including search images acquired from the buried object scanning device.

(J)

In the above embodiment, an example was given in which the search image and the construction information were compared using the reference point P1 indicating the scanning start point of the buried object scanning device 10 was used as a reference, but the present invention is not limited to this.

For instance, when scanning the buried object scanning device is commenced with reference to the edge of the wall surface, the position, etc., of the buried object or the like may be collated with reference to the edge of the wall surface, without providing any reference point.

(K)

In the above embodiment, an example was given in which a mobile terminal such as a smartphone owned by a worker was used as a dimensional information management device, but the present invention is not limited to this.

For instance, a PC (personal computer) used by a manager of the contractor who performs the construction may be used as the dimensional information management device.

In this case, the manager can check the position of the buried object and other such information while the search information and the construction information displayed on the PC are displayed on the monitor screen. Consequently, there is no need to perform marking to indicate the position of the detected buried object on the wall surface, so the burden on the worker can be reduced.

(L)

In the above embodiment, an example was given in which search information including a search image was displayed on the display screen of the display unit 49a of the dimensional information management device 40, but the present invention is not limited to this.

For instance, the grid layer including a plurality of grid lines displayed in the buried object scanning device may be superimposed with the search image on the display screen of the dimensional information management device as well.

In this case, the position of the buried object from the reference point, the distance between buried objects, the width of the buried object (dimension in the scanning direction), and so forth can be easily recognized by referring to the grid lines on the display screen on the dimensional information management device side as well.

INDUSTRIAL APPLICABILITY

Since the dimensional information management device of the present invention allows construction work to be performed on the basis of the position, size, and so forth of a buried object contained in the target, it has the effect of reducing the burden on a worker, and therefore can be broadly applied as various kinds of device for managing search images detected using a buried object scanning device.

The invention claimed is:

1. A dimensional information management device that manages dimensional information about a buried object included in a search image showing a presence or absence of a buried object in a target generated by a buried object scanning device scanned along the target, the dimensional information management device comprising: a processor configured with a program to perform operations comprising:
   acquiring search information including the search image from the buried object scanning device;
   storing the acquired search information;
   receiving input of construction information comprising the dimension information;
   collating the stored search information stored with the construction information, and determining whether the search information matches the construction information, and
   creating a construction drawing on the basis of the search information and the corresponding construction information including screwing positions if the search information matches the construction information as a result of the collation, wherein
   collating the search information comprises collating the search information with the construction information using the dimensional information related to the buried object comprised in the construction information based on a comparison of portions of a starting point included in the search image and a reference point attached to the target.

2. The dimensional information management device according to claim 1, wherein the processor is configured with the program to perform operations further comprising:
   calling up arbitrary information from the stored search information; and
   causing a first display to display the called up search information.

3. The dimensional information management device according to claim 1, wherein the construction information includes position information that is received as input about the buried object in the target.

4. The dimensional information management device according to claim 1, wherein the processor is configured with the program to perform operations such that collating the search information comprises collating the search information with the construction information by subjecting the search image including the buried object to pattern matching with drawings included in the construction information.

5. A dimensional information management system, comprising:
   the dimensional information management device according to claim 1, and
   a buried object scanning device, configured to transfer the search image to the dimensional information management device.

6. The dimensional information management device according to claim 2, wherein the processor is configured with the program to perform operations such that causing the first display to display the called up search information comprises controlling the first display so as to display position information about the buried object, whose origin is a starting point of a scan included in the search image, as the search information.

7. The dimensional information management device according to claim 2, wherein the processor is configured with the program to perform operations such that causing the first display to display the called up search information comprises controlling the first display so as to display a construction drawing in which construction information including position information for the buried object in the target is reflected in the search information.

8. The dimensional information management device according to claim 3,
wherein the construction information includes information about at least one of the following: a name and dimensions of the buried object that is a construction target, and a position, type, pitch, and number of screws to be used.

9. The dimensional information management system according to claim 5,
wherein the buried object scanning device comprises: a second processor configured with a second program to perform operations comprising:
detecting the presence or absence of the buried object;
converting a detection result from the detection of the presence or absence of the buried object, into the search image;
storing the search image and a grid layer including grid lines corresponding to a predetermined scale; and
displaying the search image and the grid layer on a second display.

10. The dimensional information management device according to claim 3,
wherein the processor is configured with the program to perform operations such that collating the search information comprises collating the search information with the construction information by using the starting point included in the search image as a reference point.

11. The dimensional information management system according to claim 9, wherein the second processor is configured with the second program to perform operations further comprising:
inputting various operations; and
controlling the second display so that the search image and the grid layer are displayed superimposed with respect to each other, and the search image is displayed movable relative to the grid layer in response to the input of the various operations.

12. A dimensional information management method for managing dimensional information about a buried object included in a search image showing a presence or absence of the buried object in a target generated by a buried object scanning device scanned along the target, said dimensional information management method comprising:
acquiring search information including the search image from the buried object scanning device;
storing the acquired search information;
receiving input of construction information comprising the dimension information;
collating the stored search information with the construction information, and determining whether the search information matches the construction information, and
creating a construction drawing on the basis of the search information and the corresponding construction information including screwing positions if the search information matches the construction information as a result of the collation, wherein
collating the stored search information with the construction information comprises collating the search information with the construction information using the dimensional information related to the buried object comprised in the construction information based on a starting point included in the search image and a reference point attached to the target.

13. A non-transitory computer-readable medium storing a dimensional information management program that manages dimensional information about a buried object included in a search image showing a presence or absence of the buried object in a target generated by a buried object scanning device scanned along the target, said dimensional information management program, when read and executed, causing a computer to execute a dimensional information management method comprising:
acquiring search information including the search image from the buried object scanning device; and
storing the acquired search information;
receiving input of construction information comprising the dimension information; and
collating the stored search information with the construction information, and determining whether the search information matches the construction information, and
creating a construction drawing on the basis of the search information and the corresponding construction information including screwing positions if the search information matches the construction information as a result of the collation, wherein
collating the stored search information with the construction information comprises collating the search information with the construction information using the dimensional information related to the buried object comprised in the construction information based on a starting point included in the search image and a reference point attached to the target.

* * * * *